United States Patent
Zhou

(10) Patent No.: US 12,442,652 B2
(45) Date of Patent: Oct. 14, 2025

(54) INTERACTIVE METHOD BASED ON ELECTRONIC MAP, APPARATUS, COMPUTER DEVICE AND STORAGE MEDIUM

(71) Applicant: TENCENT TECHNOLOGY (SHENZHEN) COMPANY LIMITED, Shenzhen (CN)

(72) Inventor: Zhitong Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 243 days.

(21) Appl. No.: 18/137,841

(22) Filed: Apr. 21, 2023

(65) Prior Publication Data
US 2023/0258465 A1 Aug. 17, 2023

Related U.S. Application Data

(63) Continuation of application No. PCT/CN2022/092415, filed on May 12, 2022.

(30) Foreign Application Priority Data

Jun. 11, 2021 (CN) .......................... 202110656428.1

(51) Int. Cl.
G06T 19/20 (2011.01)
G01C 21/36 (2006.01)

(52) U.S. Cl.
CPC ..... *G01C 21/3638* (2013.01); *G01C 21/3676* (2013.01); *G06T 19/20* (2013.01)

(58) Field of Classification Search
CPC .. G01C 21/3638; G01C 21/3676; G06T 19/20
(Continued)

(56) References Cited

U.S. PATENT DOCUMENTS

2014/0347368 A1* 11/2014 Kishore ................. G01C 21/20
701/538
2016/0328875 A1* 11/2016 Fang ..................... G06V 40/176
(Continued)

FOREIGN PATENT DOCUMENTS

CN 111595349 A 8/2020
CN 111693063 A 9/2020
(Continued)

OTHER PUBLICATIONS

Thomas A. Funkhouser, Adaptive Display Algorithm for Interactive Frame Rates During Visualization of Complex Virtual Environments, 1993, Proceedings of the 20th annual conference on Computer graphics and interactive techniques (Year: 1993).*
(Continued)

*Primary Examiner* — Matthias S Weisfeld
(74) *Attorney, Agent, or Firm* — ANOVA LAW GROUP PLLC

(57) ABSTRACT

The present disclosure provides an interactive method based on electronic map, which is performed by a computer device. The method includes displaying a navigation route for a target object in a display interface of an electronic map; displaying a dynamic three-dimensional model at a target position in the navigation route, the target position indicating a current position of the target object, and a current display state of the dynamic three-dimensional model corresponding to the current moving state of the target object; and changing a display state of the dynamic three-dimensional model in response to a change of the moving state of the target object in the navigation process associated with the navigation route.

20 Claims, 26 Drawing Sheets

(58) Field of Classification Search
USPC .......................................................... 701/436
See application file for complete search history.

(56) References Cited

U.S. PATENT DOCUMENTS

| | | | | |
|---|---|---|---|---|
| 2018/0005054 A1* | 1/2018 | Yu | ............................. | G06N 3/08 |
| 2018/0315134 A1* | 11/2018 | Amitay | ................. | H04L 51/222 |
| 2020/0114814 A1* | 4/2020 | Wang | .................... | B60Q 1/2611 |
| 2021/0020038 A1* | 1/2021 | Weldemariam | ...... | G08G 1/0112 |
| 2022/0332190 A1* | 10/2022 | Yao | ......................... | H04N 5/272 |

FOREIGN PATENT DOCUMENTS

| | | | |
|---|---|---|---|
| CN | 112146649 A | 12/2020 | |
| CN | 112729327 A | 4/2021 | |
| WO | WO-2022236816 A1 * | 11/2022 | ............... G06F 9/50 |

OTHER PUBLICATIONS

The World Intellectual Property Organization (WIPO) International Search Report for PCT/CN2022/092415 Jul. 26, 2022 12 Pages (including translation).

* cited by examiner

INTERACTIVE METHOD BASED ON ELECTRONIC MAP, APPARATUS, COMPUTER DEVICE AND STORAGE MEDIUM

RELATED APPLICATIONS

This application is a continuation of PCT Application No. PCT/CN2022/092415, filed on May 12, 2022, which claims priority to Chinese Patent Application No. 2021106564281, filed with the China National Intellectual Property Administration on Jun. 11, 2021, and entitled "INTERACTIVE METHOD BASED ON ELECTRONIC MAP, APPARATUS, COMPUTER DEVICE AND STORAGE MEDIUM". The two applications are both incorporated herein by reference in their entirety.

FIELD OF THE TECHNOLOGY

This application relates to the field of computer technologies, and in particular, an interactive method based on electronic map, apparatus, computer device and storage medium.

BACKGROUND OF THE DISCLOSURE

With the development of computer technologies, electronic maps stored and consulted digitally by using the computer technologies have been used by users. For example, people can plan their routes by using the electronic maps in combination with geographic information and real-time road conditions, and navigate the planned routes.

Often, when the electronic maps are used, arrows are used to mark the positions of users in the electronic maps, but the amount of information presented by the arrows in the navigation process is limited, which leads to relatively low application efficiency and poor user experience for the electronic maps.

SUMMARY

According to various embodiments provided in this application, an interactive method based on electronic map, apparatus, computer device and a storage medium are provided.

In one or a plurality of embodiments, an interactive method based on electronic map is provided and performed by a computer device. The method includes displaying a navigation route for a target object in a display interface of an electronic map; displaying a dynamic three-dimensional model at a target position in the navigation route, the target position indicating a current position of the target object, and a current display state of the dynamic three-dimensional model corresponding to the current moving state of the target object; and changing a display state of the dynamic three-dimensional model in response to a change of the moving state of the target object in the navigation process associated with the navigation route.

In one or more embodiments, a computer device is provided and comprises a memory and one or more processors; the memory stores computer-readable instructions; and the computer-readable instructions, when executed by the processors, cause the one or more processors to perform an interactive method with the following steps: displaying a navigation route for a target object in a display interface of an electronic map; displaying a dynamic three-dimensional model at a target position in the navigation route, the target position indicating a current position of the target object, and a current display state of the dynamic three-dimensional model corresponding to the current moving state of the target object; and changing a display state of the dynamic three-dimensional model in response to a change of the moving state of the target object in the navigation process associated with the navigation route.

In one or more embodiments, one or more non-transitory readable storage media storing computer-readable instructions are provided, and the computer-readable instructions, when executed by one or more processors, cause the one or more processors to perform, an interactive method with the following steps: displaying a navigation route for a target object in a display interface of an electronic map; displaying a dynamic three-dimensional model at a target position in the navigation route, the target position indicating a current position of the target object, and a current display state of the dynamic three-dimensional model corresponding to the current moving state of the target object; and changing a display state of the dynamic three-dimensional model in response to a change of the moving state of the target object in the navigation process associated with the navigation route.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
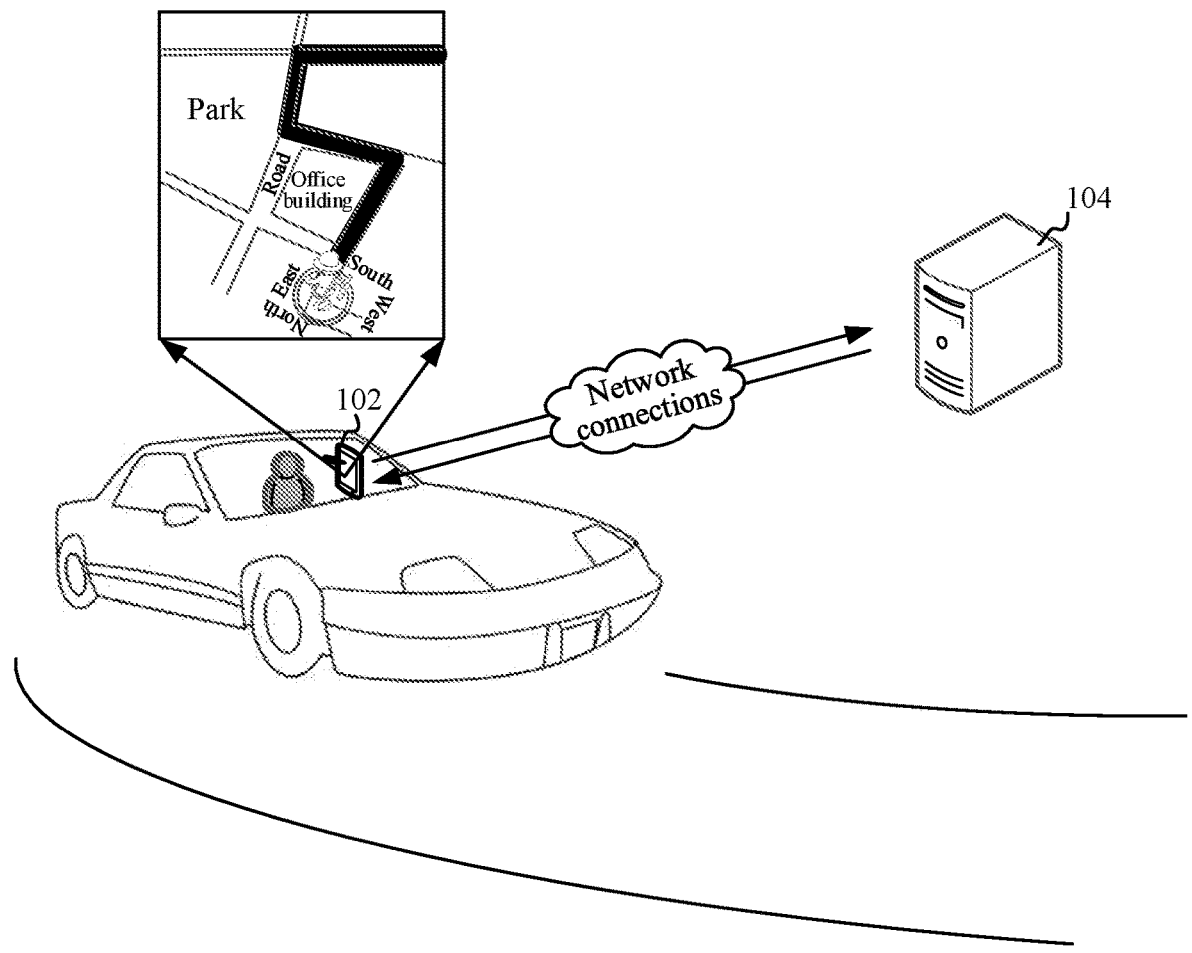
FIG. 1 is a diagram of an application environment of an interactive method based on electronic map according to one or more embodiments.

An interactive method based on electronic map provided by one or a plurality of embodiments of this application is performed by a computer device, and specifically can be applied to an application environment as shown in FIG. 1. A terminal 102 communicates with a server 104 through a network. The terminal 102 can perform positioning through the server 104 to determine the current position of a vehicle. The terminal 102 can also obtain map data from the server 104 to generate an electronic map for display. The terminal 102 navigates the vehicle through the displayed electronic map. In the display interface of the electronic map, the terminal 102 displays a navigation route for the vehicle, the current target position of the vehicle in the navigation route, and a dynamic three-dimensional model with a changeable display state, the display state of which is matched with the current moving state of the vehicle. In the navigation route-based navigation process, the display state of the dynamic three-dimensional model is changed correspondingly with the change of the moving state of the target object in the navigation process. In addition, in one or more embodiments, the interactive method based on electronic map provided by this application can also be directly realized independently by the terminal 102, that is, the terminal 102 directly performs positioning to determine the current position of the vehicle, and generates an electronic map for display through pre-stored map data. In the display interface of the electronic map, the terminal displays a navigation route for the vehicle, the current target position of the vehicle in the navigation route, and the dynamic three-dimensional model with the changeable display state, the display state of which is matched with the current moving state of the vehicle. In the navigation route-based navigation process, the display state of the dynamic three-dimensional model is changed correspondingly with the change of the moving state of the target object in the navigation process.

The terminal 102 may be, but is not limited to, a personal computer, a notebook computer, a smartphone, a tablet computer, a vehicle-mounted equipment, and a portable wearable equipment. The server 104 may be implemented by an independent server or a server cluster comprising a plurality of servers.

Figure 2:
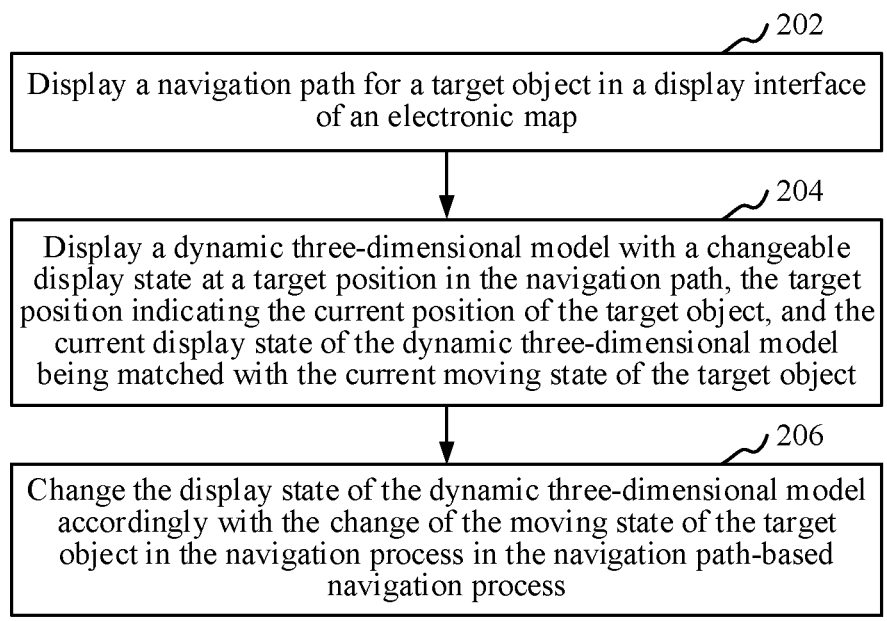
FIG. 2 is a schematic flowchart of an interactive method based on electronic map according to one or more embodiments.

In one or more embodiments, as shown in FIG. 2, an interactive method based on electronic map is provided, which is explained by taking the application of the method to the terminal in FIG. 1 as an example. It is to be understood that the method can also be applied to a server and a system including the terminal and the server, and is realized through the interaction between the terminal and the server. In one or more embodiment, the interactive method based on electronic map includes the following steps:

Step 202. display a navigation route for a target object in a display interface of an electronic map.

In one or more embodiments, an electronic map is a digital map, which is a visual map that is digitally stored and consulted by using computer technologies. The navigation by the electronic map is the process of monitoring and controlling the movement of vehicles or pedestrians from one place to another place. The display interface can be an interface for displaying the specific content of the electronic map. When the electronic map has multiple working modes, the display interface can be an interface corresponding to different working modes. The target object is a target that needs to be navigated, which can specifically include but not limited to various objects including vehicles, pedestrians and the like. The navigation route is a moving route that navigates for the target object in the process of moving from one place to another place, and the target object can be guided to move from one place to the target place through the navigation route. In one or more embodiments, the navigation route for the target object can be displayed in the display interface corresponding to the navigation mode of the electronic map. The navigation mode refers to the working mode of navigating a section of road through the electronic map. In navigation mode, the electronic map will prompt the target object to move to realize navigation.

In one or more embodiments, the terminal displays the electronic map in the interface, and in the display interface of the electronic map, for example, when the electronic map displays the display interface corresponding to the navigation mode, it indicates that navigation is needed for the target object, specifically, the terminal can respond to a navigation triggering operation triggered by a user for the electronic map, the electronic map enters the navigation mode, and the navigation route for the target object is displayed in the display interface of the electronic map. The user can control the target object, such as driving the vehicle to move according to the navigation route.

Figure 3:
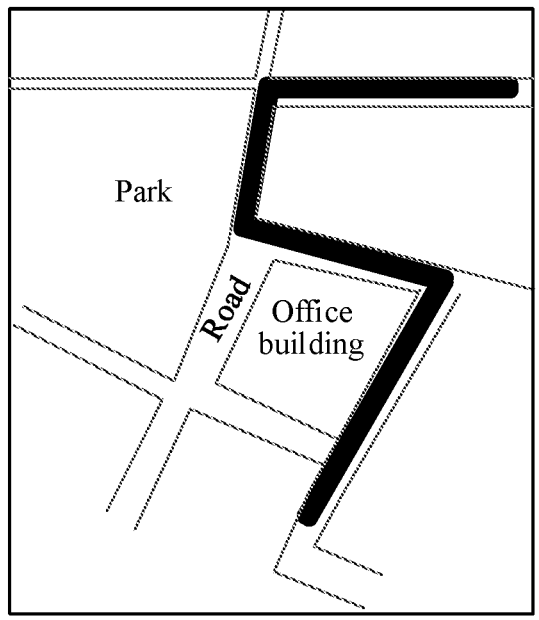
FIG. 3 is a schematic diagram of an interface displaying a navigation route according to one or more embodiments.

In one or more embodiments, as shown in FIG. 3, in the navigation mode of the electronic map, the navigation route for the target object is displayed, and the black solid line in the figure is the displayed navigation route. In one or more embodiments, in the navigation mode of the electronic map, in addition to displaying the navigation route for the target object, navigation information can also be displayed, including but not limited to navigation global information, navigation local information, traffic signal information, etc., to assist the target object to move safely and efficiently according to the navigation route.

Step 204. Display a dynamic three-dimensional model with a changeable display state at a target position in the navigation route, the target position indicating the current position of the target object, and the current display state of the dynamic three-dimensional model being matched with the current moving state of the target object.

In one or more embodiments, the dynamic three-dimensional model is a three-dimensional model, that is, a three-dimensional model, specifically, various types of models such as a person model, an animal model, and a virtual actor model. The dynamic three-dimensional model can also change different display states, which can be different action animations of the dynamic three-dimensional model, such as the display states of various action animations including but not limited to standing, walking, running and falling to the ground. The display state of the dynamic three-dimensional model can be changed, and the change range of the specific display state can be set according to the actual needs, for example, multiple display states can be preset for changing among the preset display states. The current moving state refers to the moving state corresponding to the target object when the navigation route is displayed, and the moving state represents the movement situation of the target object, and specifically can be obtained according to the moving speed of the target object. For example, when the target object is not moving, the corresponding moving state can be a static state; and when the moving speed of the target object is relatively high, the corresponding moving state can be a high-speed moving state. In addition, the moving state of the target object can also be determined according to the road information of the current position of the target object. For example, when a road of the current position of the target object is congested, it can be determined that the moving state of the target object is a static state or a low-speed moving state.

In one or more embodiments, in the display interface of the electronic map, the terminal displays the dynamic three-dimensional model with the changeable display state at the current target position of the target object in the displayed navigation route, so as to identify the current target position of the target object in the navigation route by the dynamic three-dimensional model. In one or more embodiments, the current display state of the dynamic three-dimensional model is matched with the current moving state of the target object, so that the moving state of the target object can be represented by the display state of the dynamic three-dimensional model displayed in the electronic map. If the current moving state of the target object is the static state, the current display state of the dynamic three-dimensional model can also be the static display state, and the dynamic three-dimensional model is shown as standing in place. In one or more embodiments, determination can be performed according to a scene where the electronic map is located. If the electronic map is in a three-dimensional map scene in the navigation mode, that is, map elements displayed in the navigation mode are three-dimensional elements, the dynamic three-dimensional model with the changeable display state is displayed at the current position of the target object in the navigation route; if the electronic map is in a two-dimensional map scene, for example, even in a two-dimensional map scene in the navigation mode, map elements displayed in the navigation mode are two-dimensional elements, and the current position of the target object in the navigation route can be marked by a two-dimensional model mark, for example, an image identifier, corresponding to the dynamic three-dimensional model. In one or more embodiments, the map scene of the electronic map may not be distinguished, that is, when the electronic map is in the navigation mode, whether the electronic map is in the two-dimensional map scene or the three-dimensional map scene, the current position of the target object can be marked by the dynamic three-dimensional model with the changeable display state.

Figure 4:
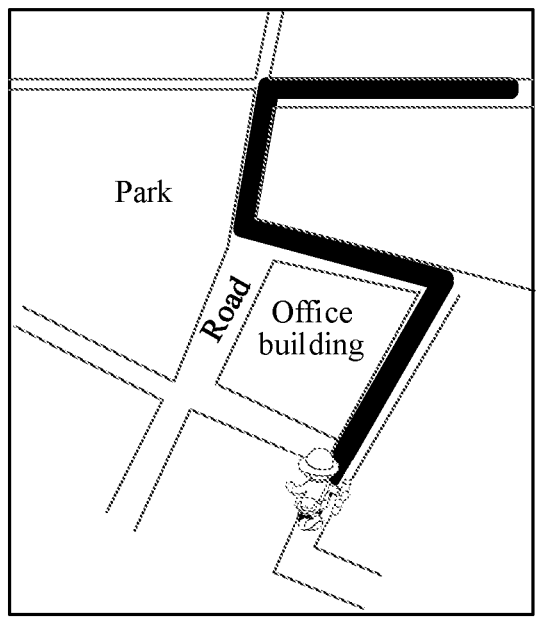
FIG. 4 is a schematic diagram of an interface displaying a dynamic three-dimensional model of a person according to one or more embodiments.

In one or more embodiments, as shown in FIG. 4, the dynamic three-dimensional model with the changeable display state is displayed at the current position of the target object in the navigation route, a person model in the figure marks the position of the target object, and the display state of the person model is matched with the current moving state of the target object; and the person model as shown in FIG. 4 is in a walking display state. The moving state of the target object can be displayed through the display state of the dynamic three-dimensional model through the display state matched with the current moving state of the target object, then the user can directly know the moving state of the target object according to the dynamic three-dimensional model displayed in the navigation route, that is, the dynamic three-dimensional model can not only present the current position of the target object, but also present the moving state of the target object, and thus, the amount of information presented in the navigation process is increased; and the user can move based on more information, which is beneficial to improving the use efficiency of navigation and improving the user experience.

Step 206. Change the display state of the dynamic three-dimensional model accordingly with the change of the moving state of the target object in the navigation process in the navigation route-based navigation process.

In one or more embodiments, when navigation is performed for a user based on the navigation route displayed by the terminal, in the navigation process, the display state of the dynamic three-dimensional model can be changed, and is specifically changed accordingly with the change of the moving state of the target object in the navigation process. For example, if the moving state of the target object is changed to low-speed movement, the display state of the dynamic three-dimensional model can be changed to a walking display state; and if the moving state of the target object is changed to high-speed movement, the display state of the dynamic three-dimensional model can be changed to a running display state. In one or more embodiments, the division between low-speed movement and high-speed movement can be preset according to actual needs, for example, the division between low-speed movement or high-speed movement is performed according to the moving speed of the target object. In the navigation process, the display state of the dynamic three-dimensional model is changed according to the change of the moving state of the target object, so that the moving state of the target object can be displayed in real time through the display state of the dynamic three-dimensional model, the amount of information presented in the navigation process is increased, and the user can move based on more information, which is beneficial to improving the use efficiency and the user experience.

Figure 5:
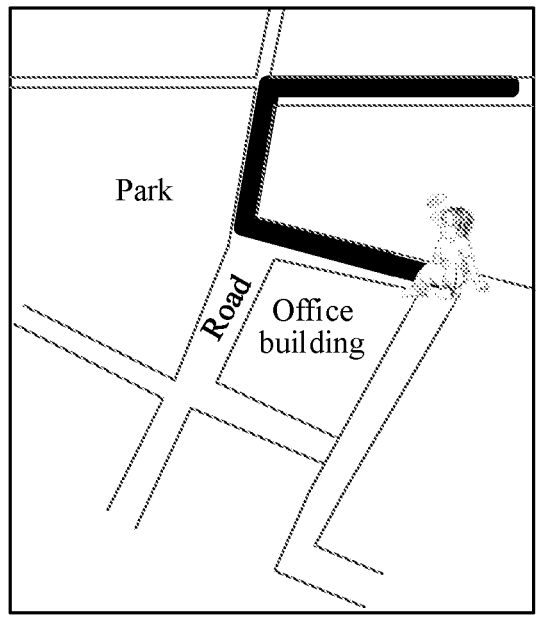
FIG. 5 is a schematic diagram of an interface with a dynamic three-dimensional model displaying dizziness according to one or more embodiments.
Figure 6:
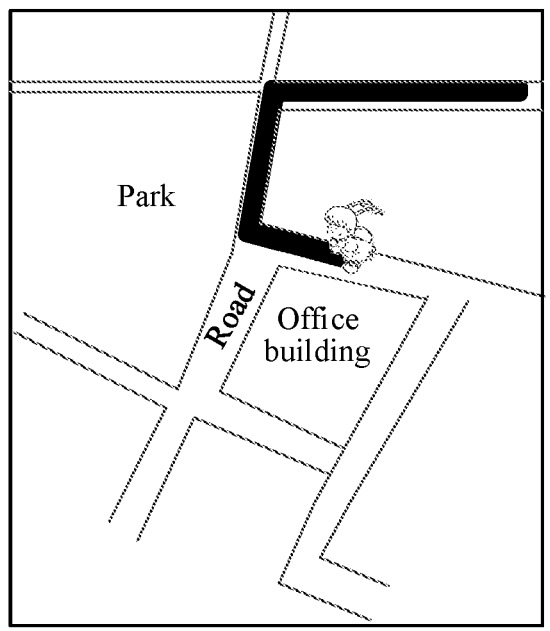
FIG. 6 is a schematic diagram of an interface with a dynamic three-dimensional model displaying running according to one or more embodiments.

In one or more embodiments, as shown in FIG. 5, in the navigation route-based navigation process, if the road is congested and the target object cannot move smoothly, the display state of the dynamic three-dimensional model can be a dizziness display state. In one or more embodiments, as shown in FIG. 6, in the navigation route-based navigation process, if the target moving object is in a high-speed moving state, the display state of the dynamic three-dimensional model can be a running display state.

The interactive method based on electronic map provided in one or more embodiments includes the following steps: displaying a navigation route for a target object in a display interface of an electronic map; displaying a dynamic three-dimensional model with a changeable display state, the display state of which is matched with the current moving state of the target object, at the current target position of the target object in the navigation route; and changing the display state of the dynamic three-dimensional model accordingly with the change of the moving state of the target object in the navigation process in the navigation route-based navigation process. In the navigation process, the dynamic three-dimensional model with the changeable display state identifies the current target position of the target object in the navigation route, the display state of the dynamic three-dimensional model is changed correspondingly with the change of the moving state of the target object, thus, the amount of information presented in the navigation process is increased through the dynamic three-dimensional model, navigation is performed based on more information presented, and the use efficiency of the dynamic three-dimensional model in the navigation process is improved.

In one or more embodiments, the changing the display state of the dynamic three-dimensional model accordingly with the change of the moving state of the target object in the navigation process in the navigation route-based navigation process comprises: changing the display state of the dynamic three-dimensional model into a display state corresponding to the changed moving state of the target object when the moving state of the target object changes in the navigation route-based navigation process; and the change of the moving state of the target object corresponds to the change of the moving speed of the target object.

In one or more embodiments, the change of the moving state of the target object corresponds to the change of the moving speed of the target object, and the moving speed can be determined by the terminal based on the change of the positioning information of the target object in unit time. When the target object is provided with a speed sensor, the moving speed can also be obtained by the terminal from the speed sensor. The corresponding relationship between the moving speed and the moving state of the target object can be set according to the actual needs. For example, the moving speed can be divided into a plurality of speed thresholds according to the numerical value, and each speed threshold corresponds to a different moving state. For example, the moving speed can be divided into five speed thresholds, which correspond to five different moving states. After the terminal determines the moving speed of the target object, the corresponding moving state can be determined based on the corresponding relationship between the moving speed and the moving state, and thus, the determination of the moving state of the target object is realized.

In one or more embodiments, in the navigation route-based navigation process of the target object, the target object moves according to the navigation route, the position of the target object changes according to the moving situation, and the terminal monitors the moving speed of the target object and determines the corresponding moving state of the target object based on the moving speed; when the moving state changes, the display state of the dynamic three-dimensional model in the navigation route displayed by the terminal is also changed correspondingly, specifically, the display state is changed into a display state corresponding to the changed moving state of the target object, so that the display state of the dynamic three-dimensional model can represent the moving speed of the target object in the navigation route-based navigation process, and thus, the amount of information presented by the dynamic three-dimensional model is increased. In one or more embodiments, the display state of the dynamic three-dimensional model is set to correspond to the corresponding moving state of the target object, that is, different moving states of the target object are provided with corresponding display states, so that the corresponding change of the display state of the dynamic three-dimensional model can be realized.

In one or more embodiments, the terminal determines the corresponding moving state according to the moving speed of the target object; after it is determined that the moving state is changed, the display state of the dynamic three-dimensional model displayed by the terminal is changed into a display state corresponding to the changed moving state of the target object, thus, the moving speed of the target object is represented through the display state of the dynamic three-dimensional model, and the amount of information represented by the dynamic three-dimensional model is increased, which is beneficial to quickly displaying the change of the moving speed of the target object without interface conversion through complicated operations.

In one or more embodiments, the changing the display state of the dynamic three-dimensional model into a display state corresponding to the changed moving state of the target object when the moving state of the target object changes includes: changing the display state of the dynamic three-dimensional model into a static display state when the moving speed of the target object is less than a first speed threshold; changing the display state of the dynamic three-dimensional model into the display state of moving at a first frequency when the moving speed of the target object is not less than the first speed threshold and less than a second speed threshold, the second speed threshold being greater than the first speed threshold; and changing the display state of the dynamic three-dimensional model into the display state of moving at a second frequency when the moving speed of the target object is not less than the second speed threshold, and the second frequency being greater than the first frequency.

In one or more embodiments, the first speed threshold, the second speed threshold, the first frequency and the second frequency can be flexibly set according to actual needs. The first speed threshold and the second speed threshold are speed thresholds for dividing the moving state of the target object, and the second speed threshold is greater than the first speed threshold. For example, the first speed threshold can be set to 0.8 meter per second and the second speed threshold can be set to 16 meters per second. Through the first speed threshold and the second speed threshold, the moving speed of the target object can be divided into three ranges, including less than the first speed threshold, not less than the first speed threshold and less than the second speed threshold, and not less than the second speed threshold, which correspond to three different moving states respectively. The first frequency and the second frequency are the moving frequencies corresponding to different moving speeds in the different display states of the dynamic three-dimensional model display, such as the frequency of leg stepping or the frequency of arm swinging when the dynamic three-dimensional model moves. The higher the frequency, the higher the moving speed in the display state represented by the dynamic three-dimensional model.

In one or more embodiments, in the navigation route-based navigation process, the terminal determines the moving speed of the target object. When the moving speed of the target object is less than a preset first speed threshold, it can be considered that the current moving state of the target object is static, that is, the target object may stop moving, and then the display state of the dynamic three-dimensional model is changed into a static display state, for example, the dynamic three-dimensional model can be in the display state of standing still, that is, the dynamic three-dimensional model in the navigation route displayed by the terminal stands in the same place and moves differently, and the dynamic three-dimensional model can also show various postures such as breathing, greeting and staring blankly. The display state of the dynamic three-dimensional model is changed to the static display state, which indicates that the dynamic three-dimensional model is in place and is not moving, that is, the corresponding target object is not moving. When the moving speed of the target object is not less than the first speed threshold and less than the preset second speed threshold, it indicates that the target object has moved and the moving speed is less than the second speed threshold, then the display state of the dynamic three-dimensional model is changed into the display state of moving at the first frequency. The display state of the dynamic three-dimensional model moving at the first frequency can be the animation display state of the dynamic three-dimensional model walking at a low speed, indicating that the target object is moving, but the moving speed is not fast.

In one or more embodiments, when the moving speed of the target object is not less than the second speed threshold, it indicates that the moving speed of the target object is fast, and then the display state of the dynamic three-dimensional model is changed into the display state of the dynamic three-dimensional model moving at a second frequency higher than the first frequency. The display state of the dynamic three-dimensional model moving at the second frequency higher than the first frequency can be the animation display state of the dynamic three-dimensional model running, that is, in the navigation route displayed by the terminal, the dynamic three-dimensional model displays a running action at the position of the target object, thus indicating that the target object is moving and the moving speed is fast.

In one or more embodiments, the moving speed of the target object can be divided into three ranges by the first speed threshold and the second speed threshold, which correspond to three different moving states; the display state of the dynamic three-dimensional model is changed into corresponding display states for the three different moving states of the target object, so that the moving state of the target object can be represented by the display state of the dynamic three-dimensional model, and the amount of information presented by the dynamic three-dimensional model is increased, which is beneficial to quickly displaying the change interval of the moving speed of the target object; and the change of the moving speed of the target object is displayed with no need for interface conversion through complicated operations, so that the moving speed can be adjusted quickly.

In one or more embodiments, the interactive method based on electronic map further includes: changing the display state of the dynamic three-dimensional model into a dizziness display state when the moving speed of the target object is less than the first speed threshold, and the corresponding position of the dynamic three-dimensional model in the navigation route is in a congested road condition state.

In one or more embodiments, when the moving speed of the target object is less than the first speed threshold, it indicates that the target object is not moving or moving slowly. If the terminal further determines that the corresponding position of the dynamic three-dimensional model in the navigation route is in a congested road condition state, it indicates that the target object is currently in a congested road, and the road is saturated due to too many road participants, so the target object cannot move or moves slowly. Then the display state of the dynamic three-dimensional model in the navigation route displayed by the terminal is changed into a dizziness display state, and for example, the dynamic three-dimensional model can be displayed as an animation action of dizziness and falling to the ground, thereby prompting that the current moving state of the target object is that the target object is unable to move or moves slowly due to road congestion.

In one or more embodiments, the display state of the dynamic three-dimensional model indicates that the reason why the target object is not moving or moving slowly is road congestion, thereby increasing the amount of information presented by the dynamic three-dimensional model in the navigation process; and the road condition can be quickly displayed through the dynamic three-dimensional model, which is beneficial to improving the use efficiency of the dynamic three-dimensional model in the navigation process.

In one or more embodiments, the changing the display state of the dynamic three-dimensional model into a display state corresponding to the changed moving state of the target object when the moving state of the target object changes includes: changing the display state of the dynamic three-dimensional model to a display state prompting to adjust the moving speed when the moving speed of the target object exceeds the speed limit of a road corresponding to the position of the dynamic three-dimensional model.

In one or more embodiments, the speed limit is the limit range of the road to the safe moving speed, and can be specifically determined according to the maximum speed limit and the minimum speed limit. The maximum speed limit means that the moving speed on the corresponding road cannot exceed the maximum speed specified by the maximum speed limit. The minimum speed limit means that the moving speed on the corresponding road cannot be lower than the minimum speed specified by the minimum speed limit. The speed limit can be determined according to the lowest speed and the highest speed, for example, can be the speed range between the lowest speed and the highest speed.

In one or more embodiments, the terminal obtains the speed limit of the road corresponding to the position of the dynamic three-dimensional model, and specifically, the terminal can query the speed limit from the server according to the position of the dynamic three-dimensional model, so as to determine the speed limit of the road corresponding to the position of the dynamic three-dimensional model, such as 60 km/h to 120 km/h for high-speed sections. In one or more embodiments, the speed limit of the road may also be related to different lanes or types of road participants, and then the terminal can further determine the lane of the target object and the type of the target object, thereby determining the corresponding speed limit. The terminal compares the moving speed of the target object with the speed limit. When the moving speed of the target object exceeds the speed limit of the road corresponding to the position of the dynamic three-dimensional model, that is, when the moving speed of the target object is not in the speed limit, the moving speed of the target object has potential safety hazards, and the display state of the dynamic three-dimensional model in the navigation route displayed by the terminal is changed to the display state prompting to adjust the moving speed. The display state of prompting to adjust the moving speed can be specifically the display state of different action animations of the dynamic three-dimensional model, for example, can be the display state of collision action occurring, the display state of fire animation on the soles of feet or behind, the display state of tortoise crawling animation, the display state of animation of rear-end collision or being rear-ended, etc., so as to prompt the target object to adjust the current moving speed and ensure safe movement according to the navigation route.

Figure 7:
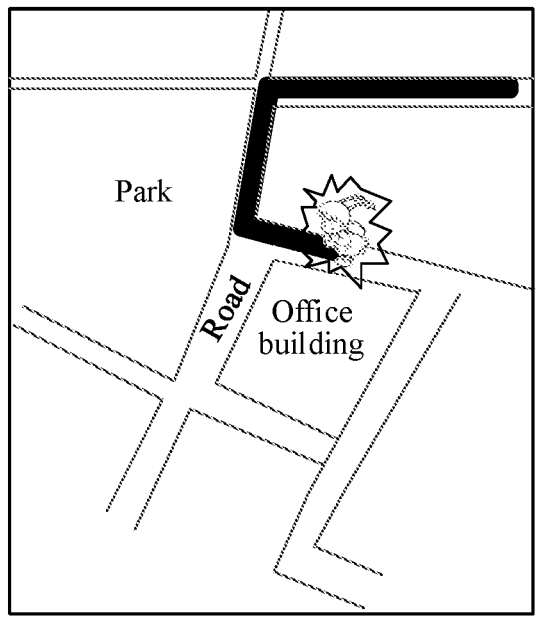
FIG. 7 is a schematic diagram of an interface with a dynamic three-dimensional model displaying the prompting of acceleration according to one or more embodiments.

In one or more embodiments, as shown in FIG. 7, when the moving speed of the target object exceeds the speed limit of the road corresponding to the position of the dynamic three-dimensional model, for example, when the moving speed of the target object is lower than the minimum speed limit of the road, the special effect of adding sparks to the dynamic three-dimensional model is used to prompt the target object to accelerate.

In one or more embodiments, when the moving speed of the target object does not meet the restriction requirements of safe road movement, the display state of prompting the target object to adjust the moving speed by the dynamic three-dimensional model is presented intuitively, so that the target object can be prompted to adjust the speed timely and accurately by the dynamic three-dimensional model to ensure safe movement and improve navigation safety.

In one or more embodiments, the displaying the display state of the dynamic three-dimensional model into a display state prompting to adjust the moving speed when the moving speed of the target object exceeds the speed limit of the road corresponding to the position of the dynamic three-dimensional model includes: changing the display state of the dynamic three-dimensional model into a display state prompting deceleration when the moving speed of the target object exceeds the first safe speed of the road corresponding to the position of the dynamic three-dimensional model; and changing the display state of the dynamic three-dimensional model to a display state prompting acceleration when the moving speed of the target object is lower than a second safe speed of the road corresponding to the position of the dynamic three-dimensional model, the second safe speed being less than the first safe speed.

In one or more embodiments, the first safe speed and the second safe speed are safe moving speeds determined according to the speed limit of the road, and specifically, can be the highest speed and the lowest speed in the speed limit, and the second safe speed is less than the first safe speed.

In one or more embodiments, after the terminal obtains the speed limit of the road corresponding to the position of the dynamic three-dimensional model, the first safe speed and the second safe speed of the road corresponding to the position of the dynamic three-dimensional model are further determined. When the terminal compares the moving speed of the target object with the first safe speed of the road corresponding to the position of the dynamic three-dimensional model and determines that the moving speed of the target object exceeds the first safe speed, the display state of the dynamic three-dimensional model in the navigation route displayed by the terminal is changed to the display state prompting deceleration, thereby prompting the target object to reduce the moving speed, so as to ensure safe movement. In one or more embodiments, when the terminal determines that the moving speed of the target object is lower than the second safe speed of the road corresponding to the position of the dynamic three-dimensional model, it indicates that the current moving speed of the target object is too slow and needs to be increased, then the display state of the dynamic three-dimensional model in the navigation route displayed by the terminal is changed to the display state prompting acceleration, thereby prompting the target object to increase the moving speed, so as to ensure safe movement.

In one or more embodiments, when the moving speed of the target object is greater than the highest safe speed, the display state of the dynamic three-dimensional model is changed into the display state prompting deceleration to prompt the target object to decelerate, and when the moving speed of the target object is less than the lowest safe speed, the display state of the dynamic three-dimensional model is changed into the display state prompting acceleration to prompt the target object to accelerate, so that the dynamic three-dimensional model can prompt the target object to accelerate or decelerate in time and accurately to ensure safe movement and improve navigation safety.

In one or more embodiments, the interactive method based on electronic map further includes: displaying at least one of safety prompt information about moving safety matched with the dynamic three-dimensional model and activity description information about the dynamic three-dimensional model when the corresponding position of the dynamic three-dimensional model in the navigation route is in a congested road condition state and the congestion duration exceeds a congestion time threshold.

In one or more embodiments, the safety prompt information is prompt information related to moving safety, is used for prompting the target object to move safely, and specifically can be propaganda information about observing traffic regulations, thereby prompting the target object to observe traffic regulations. The safety prompt information can be matched with the dynamic three-dimensional model, specifically can be the prompt information generated based on the dynamic three-dimensional model, and for example, can be propaganda animations generated based on the dynamic three-dimensional model. The activity description information is the description information of a model activity related to the dynamic three-dimensional model, for example, the information describing the reward event of the dynamic three-dimensional model. For example, the dynamic three-dimensional model can be an image model of a brand. If the time for navigation performed by using the image model meets the time requirement of the reward event, the activity description information can be information describing the rules of the reward event, and can specifically include various forms of information such as text information, picture information or audio-visual information. The congestion time threshold can be flexibly set according to the actual needs, for example, can be set to be longer than the display duration of safety prompt information and activity description information, so as to ensure that the safety prompt information and the activity description information can be completely displayed.

In one or more embodiments, the terminal determines the position of the target object; when the position of the target object is determined, that is, the corresponding position of the dynamic three-dimensional model in the navigation route is in a congested road condition state, it indicates that there are many road participants in the current position of the target object, which leads to the inability to move or the slow moving speed; then the terminal further determines the congestion duration of the congested road condition state, that is, determines the congestion duration of the position; and if the congestion duration exceeds a preset congestion time threshold, it indicates that the congestion duration is relatively long, then the terminal displays at least one of the safety prompt information about moving safety matched with the dynamic three-dimensional model and the activity description information about the dynamic three-dimensional model, thereby increasing the navigation interaction of the target object during the congestion time, relieving the waiting emotion of the user, further enhancing the amount of information presented in the navigation process, and being beneficial to improving the use efficiency. In one or more embodiments, the safety prompt information and the activity description information can be displayed selectively or alternately.

Figure 8:
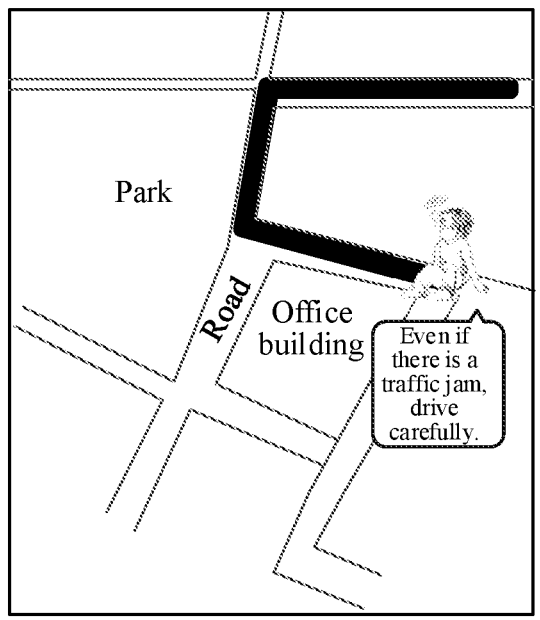
FIG. 8 is a schematic diagram of an interface with a dynamic three-dimensional model performing safety prompting according to one or more embodiments.
Figure 9:
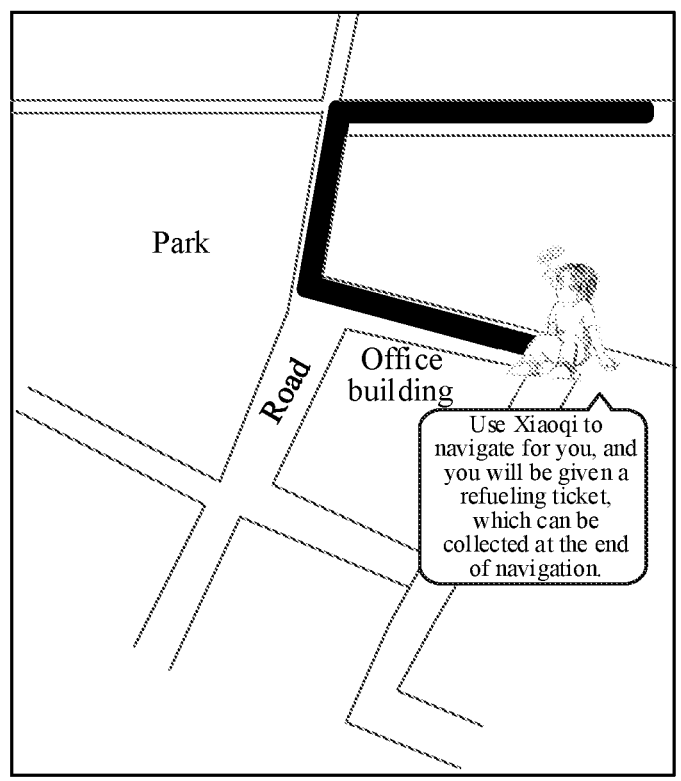
FIG. 9 is a schematic diagram of an interface with a dynamic three-dimensional model performing activity description according to one or more embodiments.

In one or more embodiments, as shown in FIG. 8, when the corresponding position of the dynamic three-dimensional model in the navigation route is in a congested road condition state and the congestion duration exceeds a congestion time threshold, the safety prompt information about moving safety matched with the dynamic three-dimensional model is displayed, and specifically, the prompt information about safe driving is broadcast through the dynamic three-dimensional model. In one or more embodiments, as shown in FIG. 9, when the corresponding position of the dynamic three-dimensional model in the navigation route is in a congested road condition state and the congestion duration exceeds the congestion time threshold, the activity description information about the dynamic three-dimensional model is displayed, specifically the corresponding dynamic three-dimensional model is used for navigation, and a refueling ticket is given, and can be collected after navigation ends.

In one or more embodiments, when the target object cannot move smoothly due to congestion in the navigation process and the duration of the congestion is relatively long, the terminal displays at least one of the safety prompt information and the activity description information, so as to increase the navigation interaction of the target object during the congestion time, relieve the waiting emotion of the user, further increase the amount of information presented in the navigation process, and help improve the use efficiency of the dynamic three-dimensional model in the navigation process.

In one or more embodiments, the interactive method based on electronic map includes: displaying a three-dimensional model list including a plurality of types of dynamic three-dimensional models in response to a model type triggering operation; selecting a dynamic three-dimensional model of a target type in response to a selection operation triggered in the three-dimensional model list; and replacing the dynamic three-dimensional model by the dynamic three-dimensional model of the target type.

In one or more embodiments, the model type triggering operation is used for triggering the updating of the dynamic three-dimensional model, for example, the dynamic three-dimensional model can be updated to various types of dynamic three-dimensional models with different themes or styles. The model type triggering operation is triggered by the user for the terminal, specifically can be triggered by the user for a model type control in an electronic map displayed by the terminal, and can also be triggered by the user for the dynamic three-dimensional model displayed by the terminal, for example, the user clicks the dynamic three-dimensional model displayed by the terminal to trigger the model type triggering operation.

In one or more embodiments, after the terminal displays the dynamic three-dimensional model at the current position of the target object in the navigation route, if the user triggers the updating of the dynamic three-dimensional model, for example, if the user touches the dynamic three-dimensional model, the model type triggering operation for updating the dynamic three-dimensional model is triggered, and the terminal displays a three-dimensional model list including various types of dynamic three-dimensional models in response to the model type triggering operation. Various types of dynamic three-dimensional models in the three-dimensional model list can be obtained by the terminal from the server. The display order of various types of dynamic three-dimensional models can be determined according to the personalized tag of the user. For example, the dynamic three-dimensional models having a high matching degree with the personalized tag of the user can be displayed first, so that the user quickly selects the corresponding type of dynamic three-dimensional model for updating.

In one or more embodiments, the user selects various types of dynamic three-dimensional models in the displayed three-dimensional model list, and the terminal selects the dynamic three-dimensional model of target type in response to the selection operation. After the user selects the dynamic three-dimensional model of the target type, the terminal can directly replace the dynamic three-dimensional model with the dynamic three-dimensional model of the target type, and navigation interaction processing is performed through the dynamic three-dimensional model after replacement. In one or more embodiments, when the user triggers a model type switching operation for the selected dynamic three-dimensional model of the target type, for example, when the user triggers a confirmation switching control, it indicates that the user confirms that the current dynamic three-dimensional model needs to be updated through the dynamic three-dimensional model of the target type, then the terminal replaces the dynamic three-dimensional model through the dynamic three-dimensional model of the target type in response to the triggered model type switching operation, that is, the dynamic three-dimensional model displayed by the terminal in the navigation route is replaced with the dynamic three-dimensional model of the target type selected by the user, and navigation interaction processing is performed through the dynamic three-dimensional model after replacement.

Figure 10:
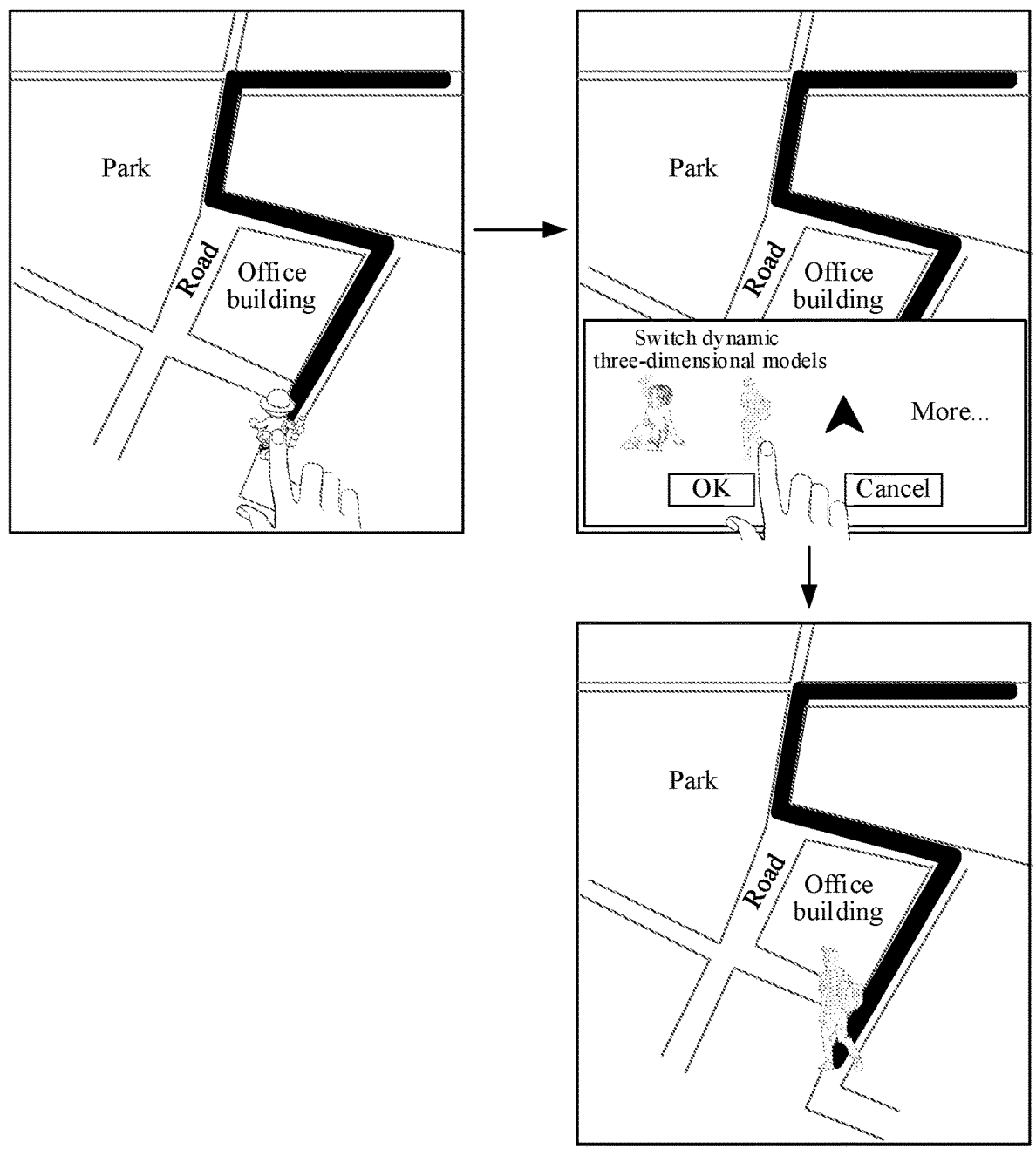
FIG. 10 is a schematic diagram of the change of an interface for switching a dynamic three-dimensional model according to one or more embodiments.

In one or more embodiments, as shown in FIG. 10, the terminal displays the dynamic three-dimensional model with a hat at the position of the target object in the navigation route, the user clicks the dynamic three-dimensional model with the hat to trigger a model type triggering operation, the terminal displays the three-dimensional model list including various types of dynamic three-dimensional models, the user selects the dynamic three-dimensional model with a backpack from the three-dimensional model list, and the terminal replaces the dynamic three-dimensional model with the hat through the dynamic three-dimensional model with the backpack.

In one or more embodiments, the terminal can replace the dynamic three-dimensional model displayed by the terminal in the navigation route with the dynamic three-dimensional model of the target type selected by the user in response to the model type switching operation triggered by the user, so that the type of the dynamic three-dimensional model can be subjected to personalized updating according to user needs, and personalized services can be provided for different users, which is beneficial to improving the use efficiency of the dynamic three-dimensional model in the navigation process.

In one or more embodiments, the interactive method based on electronic map further includes: displaying a route planning operation area corresponding to the electronic map in response to a route planning triggering operation triggered in the electronic map; displaying a planning route for the target object generated based on a route planning operation in the electronic map in response to the route planning operation triggered in the route planning operation area; and displaying a model mark corresponding to the dynamic three-dimensional model at the current positioning position of the target object in the planning route, the positioning position indicating the current position of the target object.

In one or more embodiments, the map mode refers to the working mode of the electronic map displaying geographic information. In the map mode, the electronic map can display the map information of the electronic map generated based on geographic data, such as traffic signal information, road information, building information, etc. The route planning triggering operation is a user-triggered triggering operation for route planning, and specifically can be triggered by the user for the route planning control in the electronic map. The route planning operation area is the operation area for route planning processing for the electronic map. In the route planning operation area, the user can perform route planning processing as required. In the route planning operation area, the user obtains the planning route for the target object through the route planning operation, and the number of planning routes can be one or more. When the number of planning routes is more than one, the user can further select the route to determine the navigation route to be navigated; and when the number of planning routes is one, the planning route can be directly used as the navigation route for the target object. The model mark is a mark for identifying the dynamic three-dimensional model, and specifically can be a two-dimensional image mark, so that the positioning position of the target object in the planning route is identified by the model mark corresponding to the dynamic three-dimensional model.

In one or more embodiments, the user triggers a route planning triggering operation in the electronic map to perform route planning, for example, when the electronic map is in the map mode; for example, the user triggers a navigation exiting mode when the electronic map is in the navigation mode; after the electronic map enters the map mode, the user triggers the route planning triggering operation, for example, the user clicks the route planning control corresponding to the electronic map, and the terminal displays the route planning operation area corresponding to the electronic map in response to the route planning triggering operation triggered by the user. In the route planning operation area corresponding to the electronic map, the setting information for route planning processing is displayed, and for example, may include various information such as starting point setting information, vehicle setting information, departure time setting information, and cost setting information. The user triggers the route planning operation in the route planning operation area displayed by the terminal; and for example, the user sets various setting information in the route planning operation area. The terminal obtains the planning route for the target object generated based on the route planning operation in response to the route planning operation triggered by the user in the route planning operation area, and displays the planning route in the electronic map. The terminal marks the current positioning position of the target object in the displayed planning route, and specifically displays the model mark corresponding to the dynamic three-dimensional model through the current positioning position of the target object in the planning route, so that the current position of the target object is identified in the planning route through the model mark corresponding to the dynamic three-dimensional model, so that the user can accurately know the route information of the planning route.

Figure 11:
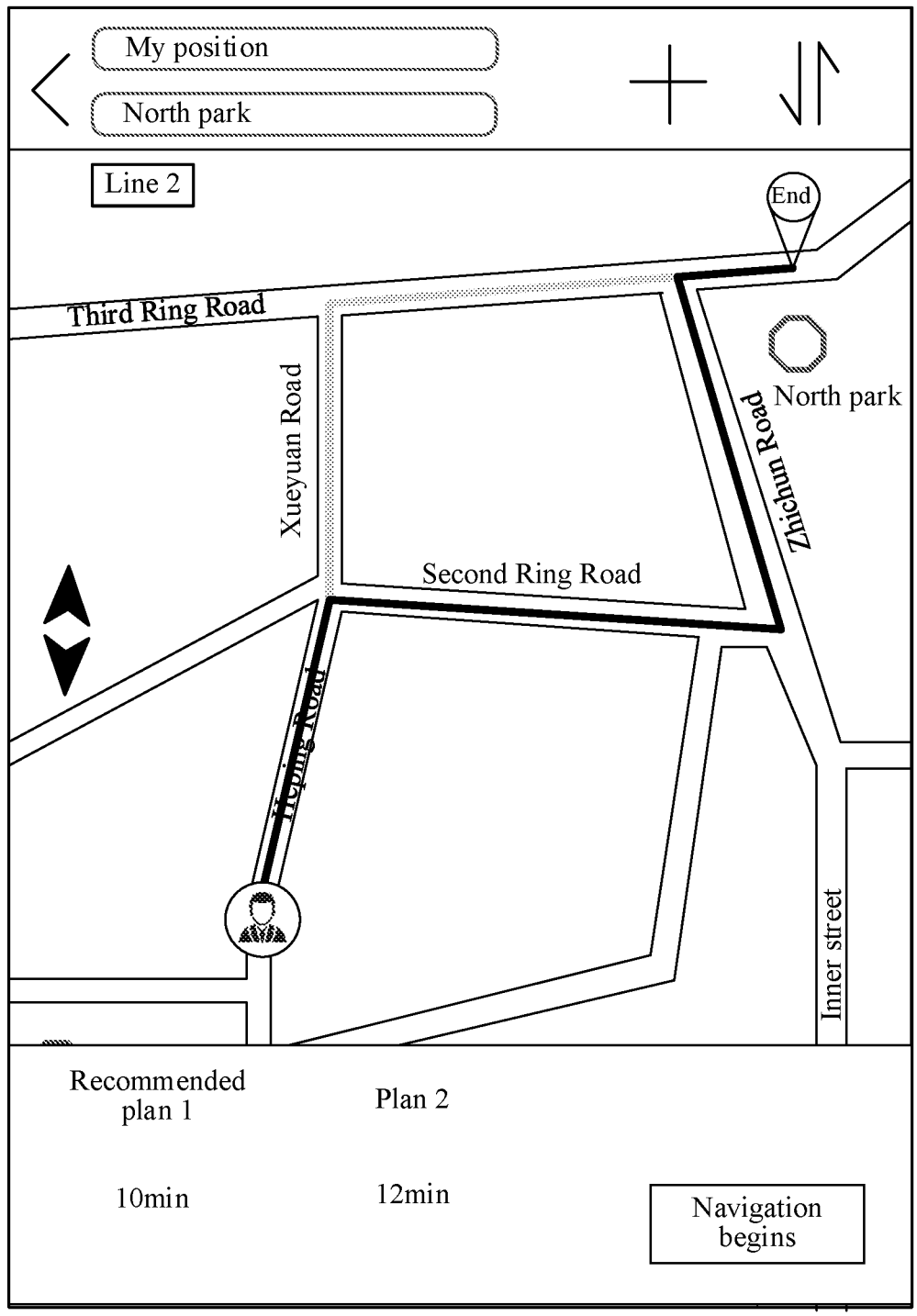
FIG. 11 is a schematic diagram of an interface displaying a planning route according to one or more embodiments.

In one or more embodiments, as shown in FIG. 11, the terminal displays the planning route for the target object generated by the user through the route planning operation. The planning route includes two schemes. Different planning routes can be marked by different colors. The user can select a navigation route from the planning routes for navigation. The model mark corresponding to the dynamic three-dimensional model is displayed at the current position of the target object in the planning route, so that the position of the target object is identified by the model mark corresponding to the dynamic three-dimensional model.

In one or more embodiments, the terminal displays the planning route for the target object generated by the user through the route planning operation in the map mode of the electronic map, and identifies the current position of the target object in the planning route through the model mark corresponding to the dynamic three-dimensional model, so that the current position of the target object is identified through the model mark corresponding to the dynamic three-dimensional model in the scene of route planning in the map mode of the electronic map, which is convenient for the user to accurately know the route information of the planning route and is beneficial to improving the navigation processing efficiency.

In one or more embodiments, the displaying the navigation route for the target object in the display interface of the electronic map includes: controlling the electronic map to enter the navigation mode in response to the navigation triggering operation triggered for the planning route; and displaying the navigation route for the target object determined from the planning route based on the navigation triggering operation in the navigation mode of the electronic map.

In one or more embodiments, the navigation triggering operation is a triggering operation selecting a planning route for navigation, specifically can select the planning route for the user, and selects the required planning route as the navigation route for navigation. In one or more embodiments, after the terminal displays the planning routes for the target object generated based on the route planning operation in the electronic map, the user can trigger the navigation triggering operation for the planning routes, for example, the user can select the target planning route as the navigation route from the planning routes for navigation based on the navigation route. The terminal determines the navigation route determined from the planning routes based on the navigation triggering operation in response to the navigation triggering operation triggered by the user for the planning routes, and triggers the electronic map to enter the navigation mode, so as to navigate for the target object based on the navigation route in the navigation mode. After the electronic map enters the navigation mode, the terminal displays the navigation route for the target object, thus facilitating the movement navigation of the target object based on the navigation route.

In one or more embodiments, the terminal controls the electronic map to enter the navigation mode in response to the navigation triggering operation triggered by the user for the result of route planning, and displays the navigation route for the target object determined by the navigation triggering operation from the planning routes in the navigation mode, so that the user can select the navigation route from the result of route planning for movement navigation, which can meet the navigation needs of the user and quickly determine the navigation route, thereby improving the processing efficiency of navigation.

In one or more embodiments, the interactive method based on electronic map further includes: displaying a model mark corresponding to the dynamic three-dimensional model at a positioning position of the target object in the electronic map when the electronic map is in a two-dimensional map scene, the positioning position indicating the current position of the target object.

In one or more embodiments, the two-dimensional map scene refers to a scene where the electronic map displays map information in a two-dimensional form, and the two-dimensional map scene is a scene where the map is viewed from an overlooking angle. When the electronic map is in a two-dimensional map scene, the map elements in the electronic map are two-dimensional elements, and at this time, the current positioning position of the target object can also be marked by a two-dimensional model mark. In one or more embodiments, when the electronic map is in a two-dimensional map scene, the map elements in the electronic map are two-dimensional elements, and the terminal displays the model mark corresponding to the dynamic three-dimensional model at the current positioning position of the target object in the electronic map, thereby identifying the current position of the target object by the two-dimensional model mark corresponding to the dynamic three-dimensional model.

In one or more embodiments, when the electronic map is in a two-dimensional map scene, the current position of the target object is identified by the two-dimensional model mark corresponding to the dynamic three-dimensional model, so that the method can be applied to map scenes of different perspectives of the electronic map, the applicable scene of the interactive method based on electronic map is expanded, and the use efficiency of the dynamic three-dimensional model in the navigation process is ensured.

In one or more embodiments, the interactive method based on electronic map includes: displaying feedback information matched with a voice control instruction in a perceptual form by the dynamic three-dimensional model in response to a voice control instruction triggered for the dynamic three-dimensional model.

In one or more embodiments, the voice control instruction is used for triggering the control on the dynamic three-dimensional model. For example, the voice control instruction can be the voice corresponding to the natural language or the voice corresponding to the preset formatting sentence. The voice control instruction can be given by the user, so that voice control is performed on the dynamic three-dimensional model through the voice control instruction, and the control processing efficiency of the dynamic three-dimensional model is improved.

In one or more embodiments, after the terminal displays the dynamic three-dimensional model in the displayed navigation route, the user can trigger the control on the dynamic three-dimensional model by giving the voice control instruction, for example, the voice control instruction can instruct the dynamic three-dimensional model to search for information. The terminal obtains the feedback information matched with the voice control instruction in response to the voice control instruction triggered by the user for the dynamic three-dimensional model. For example, when the voice control instruction is query of traffic restriction information, weather viewing or query of passing point information, and the corresponding feedback information can be traffic restriction information, weather information or passing point information which are obtained by querying. The terminal controls the dynamic three-dimensional model to display the obtained feedback information matched with the voice control instruction in a perceptible form. The perceptible form is a user-perceivable display mode, specifically such as graphic display, and voice broadcast. For example, the feedback information matched with the voice control instruction can be displayed in the form of text dialog bubbles through the dynamic three-dimensional model, or the content of the feedback information can be broadcast by voice through the dynamic three-dimensional model.

Figure 12:
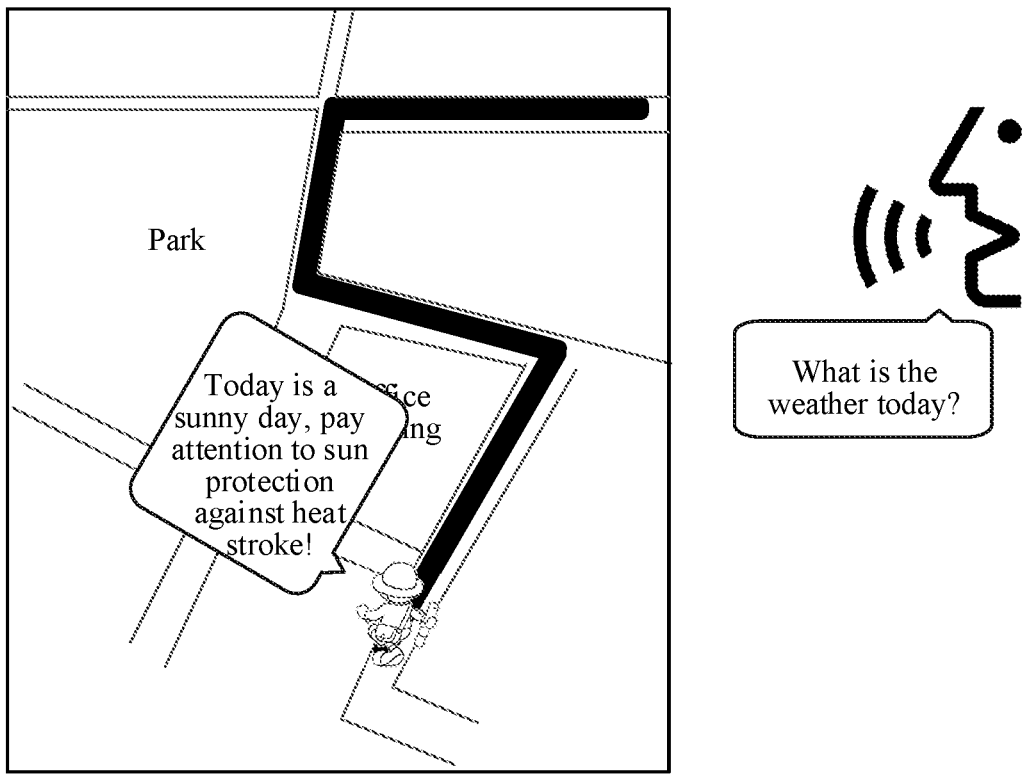
FIG. 12 is a schematic diagram of an interface with a dynamic three-dimensional model performing weather query feedback according to one or more embodiments.

In one or more embodiments, as shown in FIG. 12, the user can give a voice control instruction for the dynamic three-dimensional model to instruct the weather information query, and the terminal can display the weather information obtained by querying in a perceivable form through the dynamic three-dimensional model, specifically can display text information in the form of text bubbles, and can also broadcast voice through the dynamic three-dimensional model.

In one or more embodiments, the user can control the dynamic three-dimensional model through the voice control instruction, and the terminal displays the feedback information matched with the voice control instruction in a perceivable form through the dynamic three-dimensional model, and thus, responds to the voice control instruction of the user through the dynamic three-dimensional model, which improves the voice interaction processing efficiency in the navigation process and is beneficial to improving the use efficiency of the dynamic three-dimensional model.

In one or more embodiments, the interactive method based on electronic map further includes: displaying an actual moving route corresponding to the navigation process when the navigation route-based navigation process ends; and displaying the model marks corresponding to the dynamic three-dimensional model at a starting position and an ending position in the actual moving route respectively.

In one or more embodiments, the actual moving route is the actual moving trajectory of the target object in the navigation process, which can be specifically generated by the terminal according to the position of the target object in the navigation process. In one or more embodiments, when the navigation process ends, that is, when the target object has reached the destination, or when the user triggers the end of navigation, the terminal displays the actual moving route corresponding to the target object in the navigation process in response to the end of the navigation route-based navigation process. The two-dimensional model marks corresponding to the dynamic three-dimensional model are respectively displayed at the starting position and the ending position in the actual moving route, so that the starting position and the ending position of the target object are marked by the model marks corresponding to the dynamic three-dimensional model in the actual moving route, which is convenient for the user to determine the starting position and the ending position in the actual moving route.

In one or more embodiments, at the end of navigation, the actual moving route of the target object in the navigation process is displayed, and in the actual moving route, the starting position and ending position of the target object are marked by the model marks corresponding to the dynamic three-dimensional model, so that the starting and ending information of the actual moving route can be highlighted, which is convenient for the user to determine the starting position and the ending position in the actual moving route, and the starting and ending position information of navigation can be intuitively displayed.

In one or more embodiments, the interactive method based on electronic map further includes: displaying a model parameter configuration item corresponding to the dynamic three-dimensional model in response to a parameter configuration triggering operation triggered for the dynamic three-dimensional model; displaying target model parameters set by a parameter configuration operation in response to the parameter configuration operation triggered in the model parameter configuration item; and displaying the dynamic three-dimensional model after configuration updating of the dynamic three-dimensional model by the target model parameters in response to a confirmation operation triggered by the target model parameters.

In one or more embodiments, the parameter configuration triggering operation is used for triggering the dynamic three-dimensional model to perform parameter configuration, such as the configuration of the display parameters such as the display frame rate, size and transparency of the dynamic three-dimensional model. The model parameter configuration item includes various parameter items for configuring the dynamic three-dimensional model, and for example, can include the display frame rate, size, transparency and other parameter items. The parameter configuration operation is a configuration operation triggered by the user for the model parameter configuration item, so as to configure the parameters of the dynamic three-dimensional model, and the target model parameters are the parameters set by the user through the parameter configuration operation.

In one or more embodiments, the user can trigger the parameter configuration of the dynamic three-dimensional model by the parameter configuration triggering operation, for example, the user can click a model parameter configuration control to trigger the parameter configuration triggering operation. The terminal displays the model parameter configuration item corresponding to the dynamic three-dimensional model in response to the user-triggered parameter configuration triggering operation for the dynamic three-dimensional model, which may specifically include but not limited to parameter items such as the display frame rate, size and transparency. The user can configure each parameter item in the model parameter configuration item, and specifically can configure parameters in the model parameter configuration item through the parameter configuration operation. The terminal obtains the target model parameters set by the parameter configuration operation in response to the parameter configuration operation triggered by the user in the model parameter configuration item, and displays the parameters, so that the user can know the parameter configuration information in time. The user can confirm the configured target model parameters, and specifically, the user can trigger the confirmation operation for the target model parameters to make the target model parameters take effect. The terminal updates the configuration of the dynamic three-dimensional model through the target model parameters in response to the confirmation operation triggered by the user, and displays the dynamic three-dimensional model after the configuration of the dynamic three-dimensional model is updated through the target model parameters.

In one or more embodiments, the user can configure various parameter items of the dynamic three-dimensional model through the parameter configuration operation, so as to perform personalized configuration on the display mode of the dynamic three-dimensional model, which can meet the personalized requirements of each user and is beneficial to attracting users to identify the position and moving state by using the dynamic three-dimensional model in the navigation process, thereby enhancing the amount of information presented in the navigation process and ensuring the use efficiency.

In one or more embodiments, the interactive method based on electronic map further includes: acquiring navigation data corresponding to the navigation route when a navigation triggering instruction triggered for the electronic map is received; and performing rendering processing based on the navigation data and the model data of the dynamic three-dimensional model, so as to display the dynamic three-dimensional model with the changeable display state at the current position of the target object in the displayed navigation route.

In one or more embodiments, the navigation triggering instruction is used for instructing the electronic map to perform navigation, and can be generated according to the navigation triggering operation triggered by the user. The navigation data is the trajectory data of the navigation route for navigation, and can specifically include position information and moving navigation information of each position in the navigation route; the position information is geographical information of each position in the navigation route; and the moving navigation information is information about a route navigation prompt required in each position, and navigation processing is performed for the movement of the target object through the moving navigation information. Model data refers to model ontology data for generating the dynamic three-dimensional model and model configuration data for configuring the display of the dynamic three-dimensional model. Rendering refers to the processing of three-dimensional scenes to which images conform, specifically, the process of drawing several pictures for display by a computer and playing the pictures continuously to realize an animation effect. Rendering processing is performed based on navigation data and model data, so that the dynamic three-dimensional model with the changeable display state can be displayed in the navigation route of the electronic map.

In one or more embodiments, when the terminal receives the navigation triggering instruction triggered for the electronic map, if the user triggers the navigation triggering operation for the electronic map, the corresponding navigation triggering instruction is generated, the terminal receives the navigation triggering instruction, it indicates that navigation through the electronic map is required, then the terminal obtains the navigation data corresponding to the navigation route, and the navigation route can be rendered out in the electronic map through the navigation data for display. The terminal further obtains the model data of the dynamic three-dimensional model, and specifically can query a model database to obtain the model data of the dynamic three-dimensional model from the model database. After the navigation data and the model data of the dynamic three-dimensional model are obtained, the terminal performs rendering processing based on the navigation data and the model data, so that the dynamic three-dimensional model with the changeable display state is displayed at the current position of the target object in the displayed navigation route.

In one or more embodiments, the terminal obtains navigation data corresponding to the navigation route according to the received navigation triggering instruction, and performs rendering processing based on the navigation data and the model data of the dynamic three-dimensional model, so as to display the dynamic three-dimensional model with the changeable display state at the current of the target object in the displayed navigation route, thus, more information can be presented in the navigation process through the dynamic three-dimensional model, which is beneficial to improving the use efficiency of the dynamic three-dimensional model in the navigation process.

Figure 13:
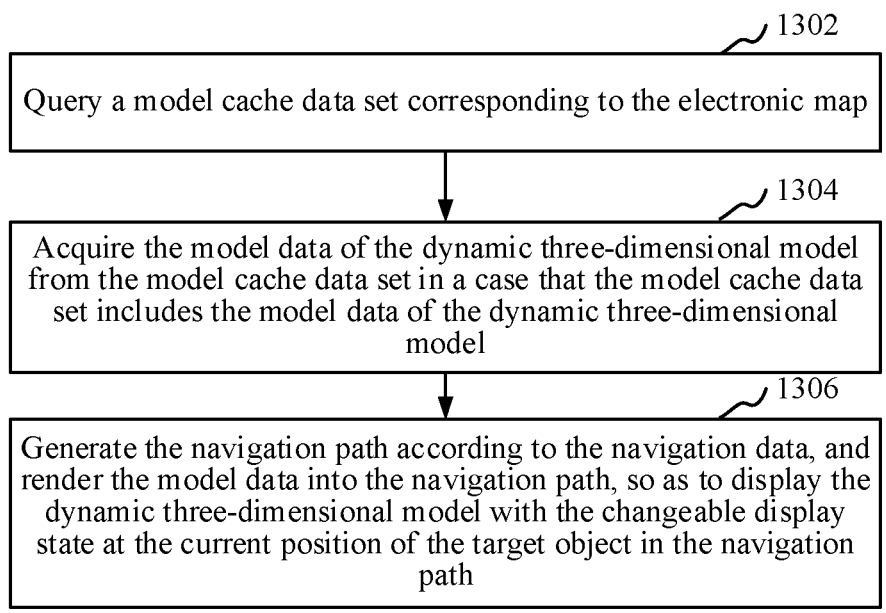
FIG. 13 is a schematic flowchart of rendering a dynamic three-dimensional model according to one or more embodiments.

In one or more embodiments, as shown in FIG. 13, performing rendering processing based on navigation data and model data, that is, performing rendering processing based on the navigation data and the model data of the dynamic three-dimensional model to display the dynamic three-dimensional model with the changeable display state at the current position of the target object in the navigation route, specifically includes:

Step 1302: Query a model cache data set corresponding to the electronic map.

In one or more embodiments, the model cache data set is a data collection that caches the model data of various types of dynamic three-dimensional models in advance. By caching the model data of the dynamic three-dimensional models in the model cache data set in advance, the model data can be quickly extracted from the model cache data set when the model data needs to be rendered, which is beneficial to improving the rendering processing efficiency. In one or more embodiments, when the terminal performs rendering processing based on the navigation data and the model data, the preset model cache data set corresponding to the electronic map is queried. The model data of the dynamic three-dimensional model can be cached in the model cache data set, and after the model data in the model cache data set exits an application corresponding to the electronic map, the terminal clears the data to release the memory resource occupation of the terminal.

Step 1304. Acquire the model data of the dynamic three-dimensional model from the model cache data set when the model cache data set includes the model data of the dynamic three-dimensional model.

In one or more embodiments, the terminal queries the model data of the dynamic three-dimensional model from the model cache data set, and if the model cache data set includes the model data of the dynamic three-dimensional model, the model data of the dynamic three-dimensional model can be directly obtained from the model cache data set. If the model cache data set does not include the model data of the dynamic three-dimensional model, it indicates that the model data is not stored in advance in the model cache data set, and the terminal can query the model data of the dynamic three-dimensional model from the model database.

Step 1306. Generate the navigation route according to the navigation data, and render the model data into the navigation route, so as to display the dynamic three-dimensional model with the changeable display state at the current position of the target object in the navigation route.

In one or more embodiments, after the navigation data and the model data are obtained, the terminal generates the navigation route according to the navigation data, the navigation route is displayed in the electronic map, and the model data is rendered into the navigation route, so that the dynamic three-dimensional model with the changeable display state is displayed at the current position of the target object in the navigation route.

In one or more embodiments, the model data of the dynamic three-dimensional model is cached in advance in the model cache data set, so that the model data that needs to be rendered can be quickly obtained directly from the model cache data set, which is beneficial to improving the rendering processing efficiency of the dynamic three-dimensional model, thus improving the navigation processing efficiency.

In one or more embodiments, the interactive method based on electronic map further includes: determining the resource saturation state of the terminal corresponding to the electronic map; and dynamically adjusting the frame rate of the dynamic three-dimensional model according to the resource saturation state and the moving state of the target object.

In one or more embodiments, the resource saturation state represents the occupation of the memory resources of the terminal. If the resources of the terminal are highly saturated, the memory resources of the terminal are limited, and it may be impossible to display the dynamic three-dimensional model at a high frame rate. Then, the frame rate of the dynamic three-dimensional model can be dynamically adjusted to be matched with the resource saturation state of the terminal corresponding to the electronic map. The memory resource consumption of the terminal can be reduced on the premise of ensuring the display effect of the dynamic three-dimensional model.

In one or more embodiments, in the navigation interaction process of the terminal, the terminal dynamically adjusts the frame rate of the displayed dynamic three-dimensional model according to the resource saturation state. In one or more embodiments, the terminal determines the resource saturation state of the terminal corresponding to the electronic map in real time or periodically in the navigation interaction process, for example, the ratio of the available memory of the terminal to the available memory of the total memory can be calculated, and the resource saturation state of the terminal can be obtained according to the ratio of the available memory. The terminal dynamically adjusting the frame rate of the dynamic three-dimensional model based on the resource saturation state and the moving state of the target object. For example, when the resource saturation state is high, that is, the terminal has less available memory resources, if the available memory accounts for less than 50% and the available memory resources are less than half, the frame rate of the dynamic three-dimensional model can be dynamically adjusted according to the moving state of the target object. In one or more embodiments, when the moving state of the target object is a static state without moving or a slow moving state, the frame rate of the dynamic three-dimensional model can be directly adjusted to 20 frames per second; when the moving state of the target object is a low-speed moving state and the resource saturation state is a high saturation state, the terminal can adjust the frame rate of the dynamic three-dimensional model to 20 frames per second to reduce resource consumption; when the moving state of the target object is a high-speed moving state, if the resource saturation state is a low saturation state, the frame rate of the dynamic three-dimensional model may not be adjusted, for example, the frame rate of 50 frames per second or 60 frames per second can be maintained to display the dynamic three-dimensional model; if the resource saturation state is a high saturation state, the frame rate of the dynamic three-dimensional model is adjusted to 20 frames per second, and when the duration of maintaining the frame rate of 20 frames per second for displaying reaches for 10 seconds, the frame rate of 50 frames per second or 60 frames per second is resumed to display the dynamic three-dimensional model for 20 seconds, the frame rate again is reduced after 20 seconds, the above processes are performed alternatively, and thus, the memory resource consumption of the terminal is reduced on the premise of ensuring the display effect of the dynamic three-dimensional model.

In one or more embodiments, in the navigation interaction process of the terminal, the terminal dynamically adjusts the frame rate of the displayed dynamic three-dimensional model according to the resource saturation state, and thus, the memory resource consumption of the terminal can be reduced on the premise of ensuring the display effect of the dynamic three-dimensional model.

In one or more embodiments, the interactive method based on electronic map further includes: acquiring actual moving data corresponding to the navigation process when the navigation route-based navigation process ends; acquiring the model marks corresponding to the dynamic three-dimensional model; and generating an actual moving route according to the actual moving data, and rendering the model marks to the starting position and the ending position in the actual moving route.

In one or more embodiments, the actual moving data is the trajectory data of the actual movement of the target object in the navigation process, specifically including the data of the position of the target object in the navigation process, and the actual moving route is the trajectory of the actual movement of the target object in the navigation process. The model mark is a mark for identifying the dynamic three-dimensional model, and specifically can be a two-dimensional image mark, so that the position of the target object in the planning route is identified by the model mark corresponding to the dynamic three-dimensional model.

In one or more embodiments, when the navigation process ends, that is, when the target object has reached the destination, or when the user triggers the end of navigation, the terminal obtains the actual movement data corresponding to the target object in the navigation process in response to the end of the navigation route-based navigation process, and can generate the actual movement route corresponding to the target object in the navigation process based on the actual movement data. The terminal obtains the model marks corresponding to the dynamic three-dimensional model and renders the model mark to the starting position and the ending position in the actual moving route, and can specifically display the two-dimensional model marks corresponding to the dynamic three-dimensional model respectively at the starting position and the ending position in the actual moving route, so as to mark the starting position and the ending position of the target object by the model marks corresponding to the dynamic three-dimensional model in the actual moving route, which is convenient for the user to determine the starting position and the ending position in the actual moving route.

In one or more embodiments, at the end of navigation, the actual moving route is generated according to the actual moving data of the target object in the navigation process; the starting position and the ending position of the target object are marked in the actual moving route by the model marks corresponding to the dynamic three-dimensional model, so that the starting and ending information of the actual moving route can be highlighted, which is convenient for the user to accurately determine the starting position and the ending position in the actual moving route.

In one or more embodiments, after the navigation route for the target object is displayed in the display interface of the electronic map, the method further includes: acquiring a three-dimensional model diagram matched with the dynamic three-dimensional model when the terminal corresponding to the electronic map does not meet the dynamic model display condition; and displaying the three-dimensional model diagram at the current position of the target object in the navigation route.

In one or more embodiments, the dynamic model display conditions can be set according to actual needs, for example, when the available resources of the terminal are insufficient, or when the terminal does not support the dynamic display of the dynamic three-dimensional model, the three-dimensional model diagram matched with the dynamic three-dimensional model can be displayed at the terminal. The three-dimensional model diagram can be a static two-dimensional image obtained by static screenshot interception of the dynamic three-dimensional model. By displaying the three-dimensional model diagram in the navigation route instead of the dynamic three-dimensional model, the position of the target object can be identified by the three-dimensional model diagram when the dynamic model display condition is not met.

In one or more embodiments, after the terminal displays the navigation route for the target object in the navigation mode of the electronic map, if the situation that the terminal does not meet the dynamic model display condition is detected, for example, the terminal has less memory resources and no spare memory resources to display the dynamic three-dimensional model, then the terminal obtains the three-dimensional model diagram matched with the dynamic three-dimensional model. The three-dimensional model diagram is matched with the dynamic three-dimensional model, and specifically can be a static image of the dynamic three-dimensional model. After the three-dimensional model diagram matched with the dynamic three-dimensional model is obtained, the terminal displays the three-dimensional model diagram at the current position of the target object in the navigation route, thereby identifying the position of the target object in the navigation route through the three-dimensional model diagram matched with the dynamic three-dimensional model.

In one or more embodiments, when the terminal cannot support the display of the dynamic model, the three-dimensional model diagram matched with the dynamic three-dimensional model is displayed in the navigation route to replace the dynamic three-dimensional model, the position of the target object can be identified by the three-dimensional model diagram, thus, the identification effect of the position is guaranteed while the normal operation of the terminal is guaranteed, and the use efficiency of the dynamic three-dimensional model in the navigation process is improved.

Figure 14:
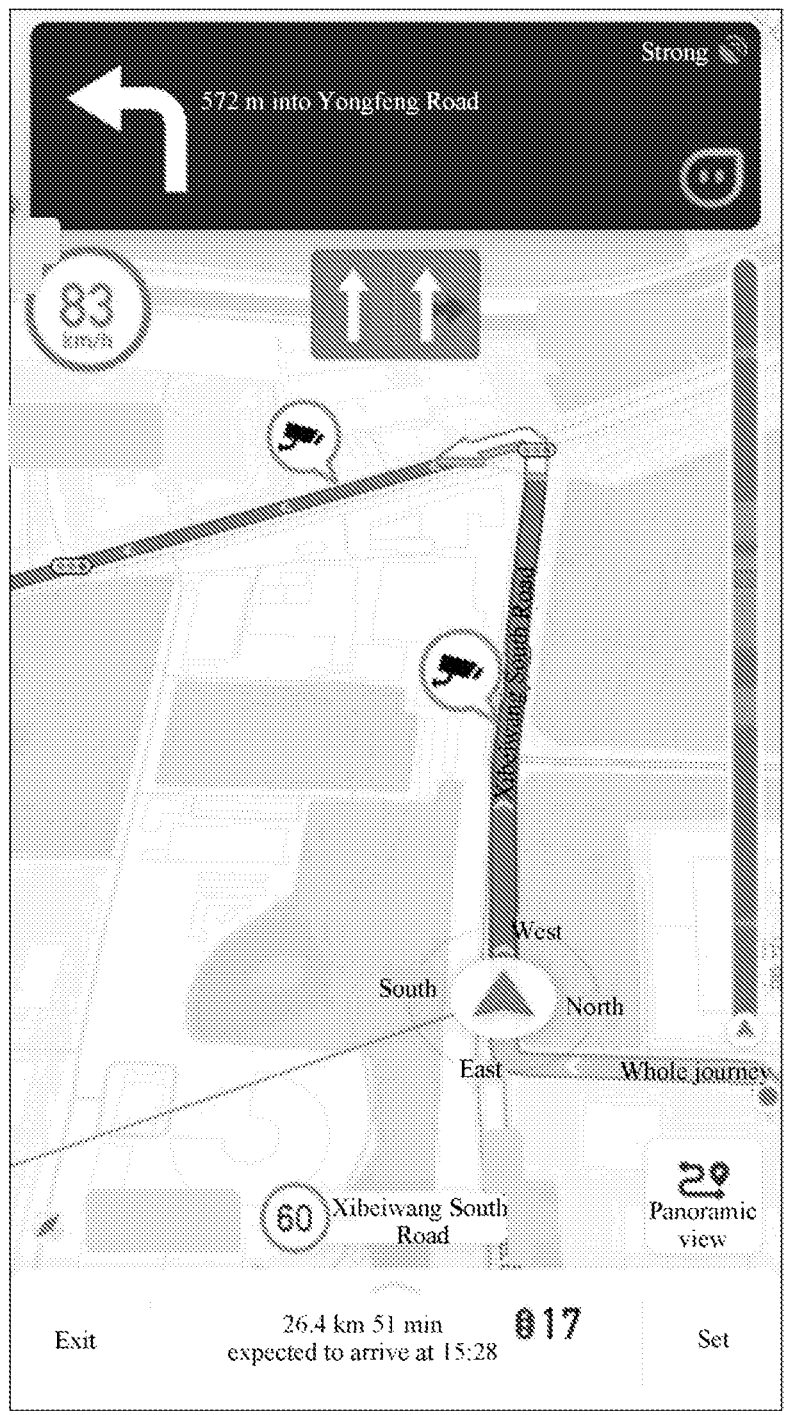
FIG. 14 is a schematic flowchart of an interface marking the position of a target object by an arrow through a related technology.
Figure 15:
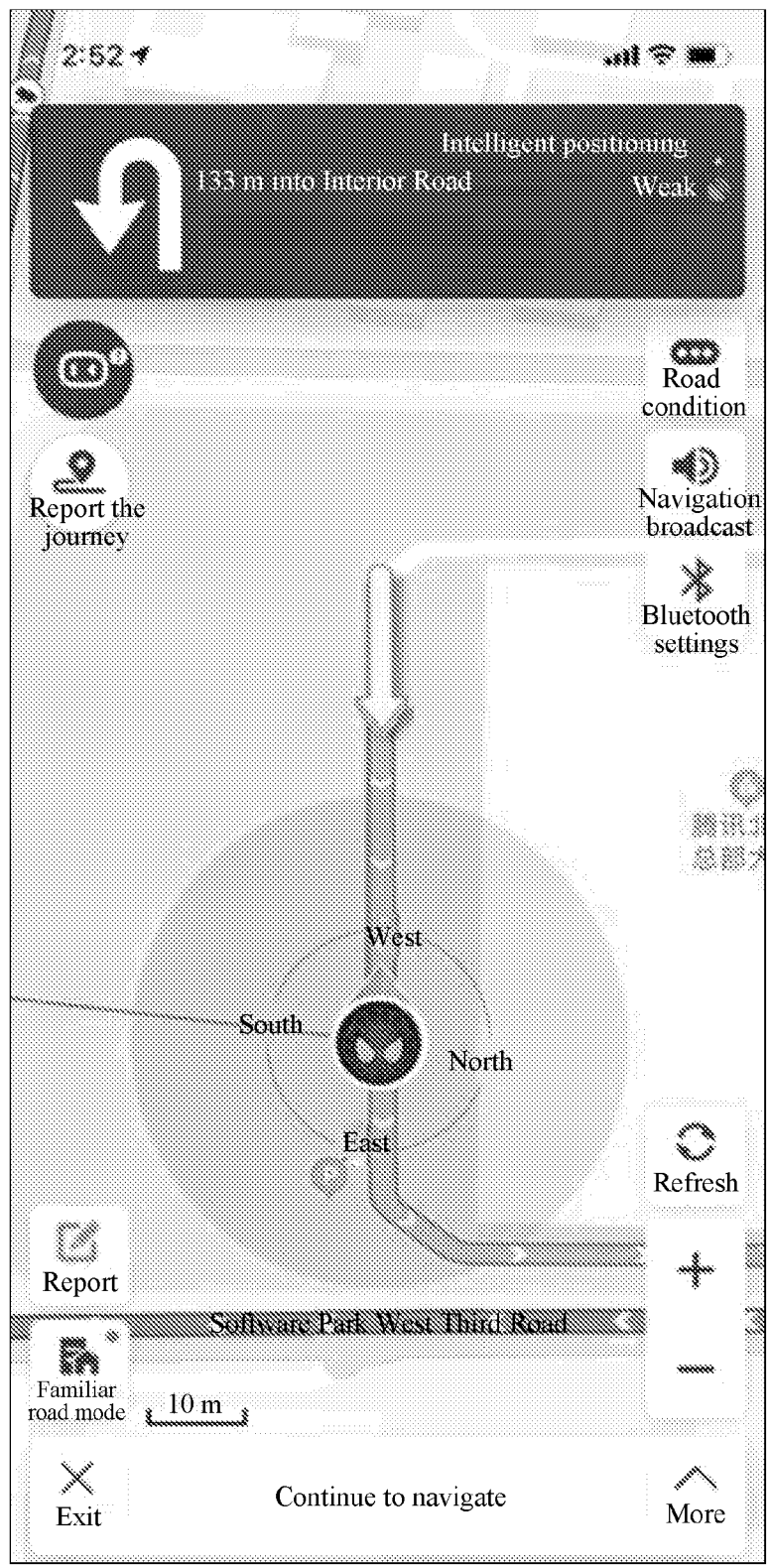
FIG. 15 is a schematic flowchart of an interface marking the position of a target object by a two-dimensional picture through a related technology.
Figure 16:
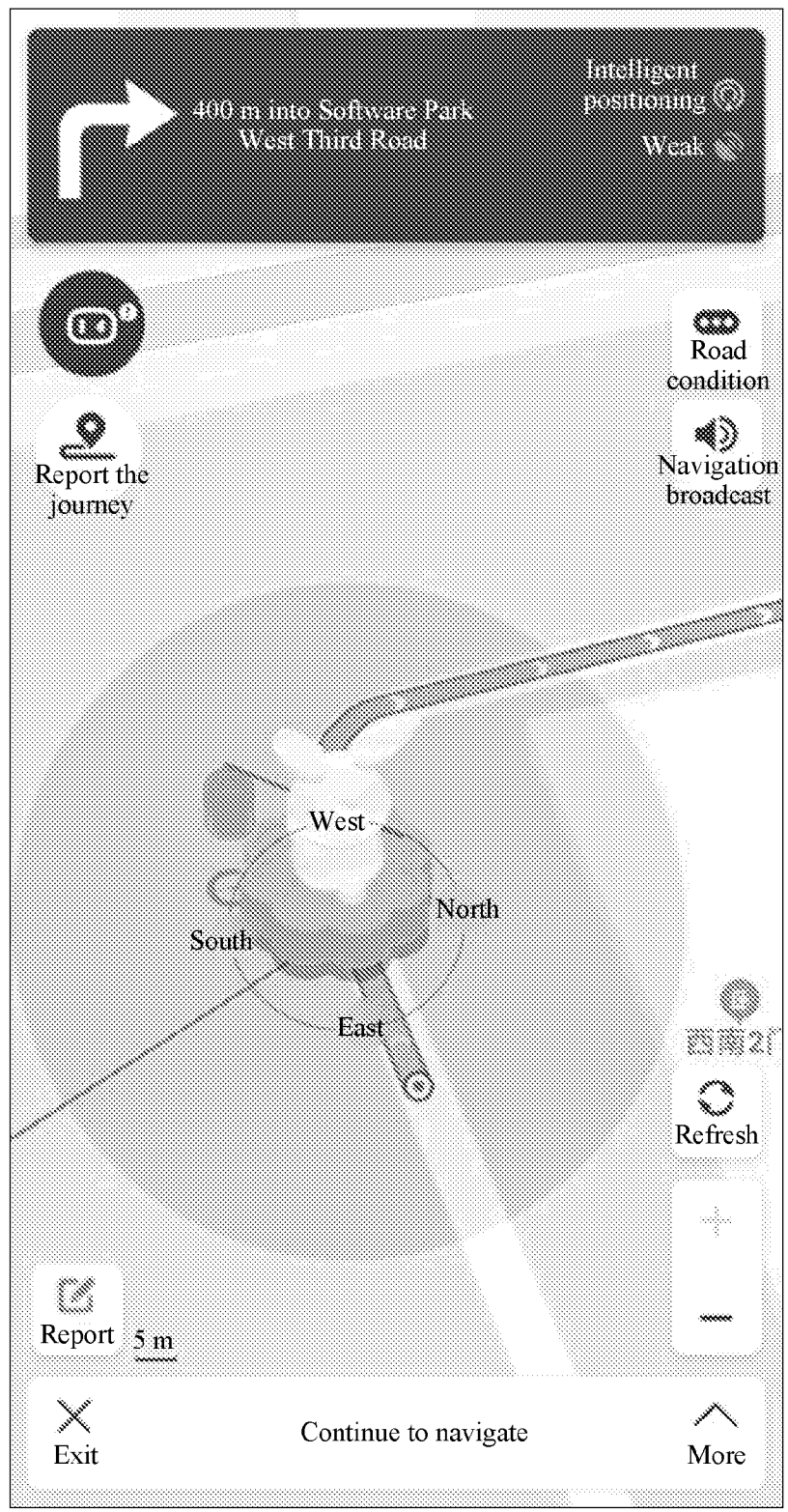
FIG. 16 is a schematic flowchart of an interface marking the position of a target object by a 3D model through a related technology.

In one or more embodiments, an application scene is provided and is applied to the interactive method based on electronic map. In one or more embodiment, the application of the interactive method based on electronic map in the application scene is as follows:

When navigation is performed based on the electronic map, the current position of the user is often marked in the electronic map, and the position and direction of the navigation object are generally identified by a blue arrow and a direction compass. As shown in FIG. 14, the position of the navigation object is identified by the arrow, and the direction of the navigation object is identified by the compass and the arrow direction. However, the navigation object is identified by the blue arrow, which can present less information and lack of three-dimensional realism. In addition, in the traditional technology, there is also a process of identifying the position of the navigation object by pictures. As shown in FIG. 15, the position of the navigation object is identified by pictures instead of arrows. Further, in the traditional technology, there is a process of identifying the navigation object through a 3D (3-Dimension) model. As shown in FIG. 16, the position of the navigation object in the navigation route is identified by the 3D model. However, the size of the 3D model is generally large, which is easy to block the key geographic information in navigation. Moreover, the directional compass is attached to the top of the 3D model, has a poor impression, not only interferes with the display of the 3D model, but also cannot be clearly displayed, which results in limited information presented in the navigation process, thus affecting the use efficiency.

Figure 17:
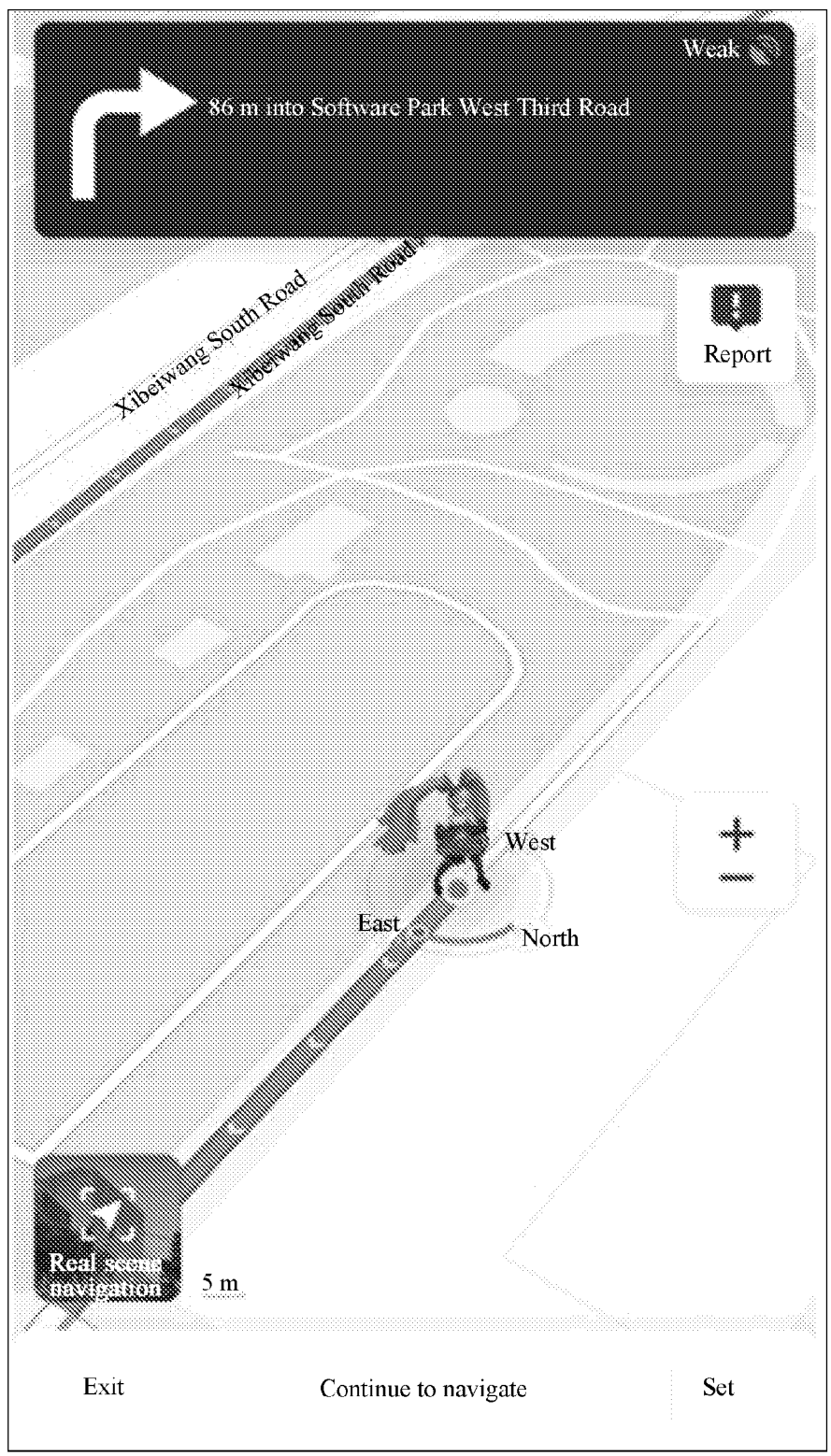
FIG. 17 is a schematic diagram of an interface marking the position of a target object by a dynamic three-dimensional model according to one or more embodiments.

Based on this, the interactive method based on electronic map provided by this embodiment, as shown in FIG. 17, in the navigation process based on the electronic map, the current position of the navigation target object is identified by the dynamic three-dimensional model with the changeable display state; the current display state of the dynamic three-dimensional model is matched with the current moving state of the target object; and the display state of the dynamic three-dimensional model can be realized based on 3D animations, specifically based on skeleton animations, thus, more navigation information can be presented in the navigation process through the dynamic three-dimensional model, which is beneficial to improving the use efficiency of navigation. In skeleton animations, the object itself that needs to be animated does not record displacement, rotation, scaling and deformation information, but records animation information through a "skeleton" object of a third party, and then the object itself only records the weights affected by the skeleton object. During playing, the animations are reproduced through the key frames of the skeleton object and the weights recorded by the object, thus realizing the dynamic display of the dynamic three-dimensional model.

Figure 18:
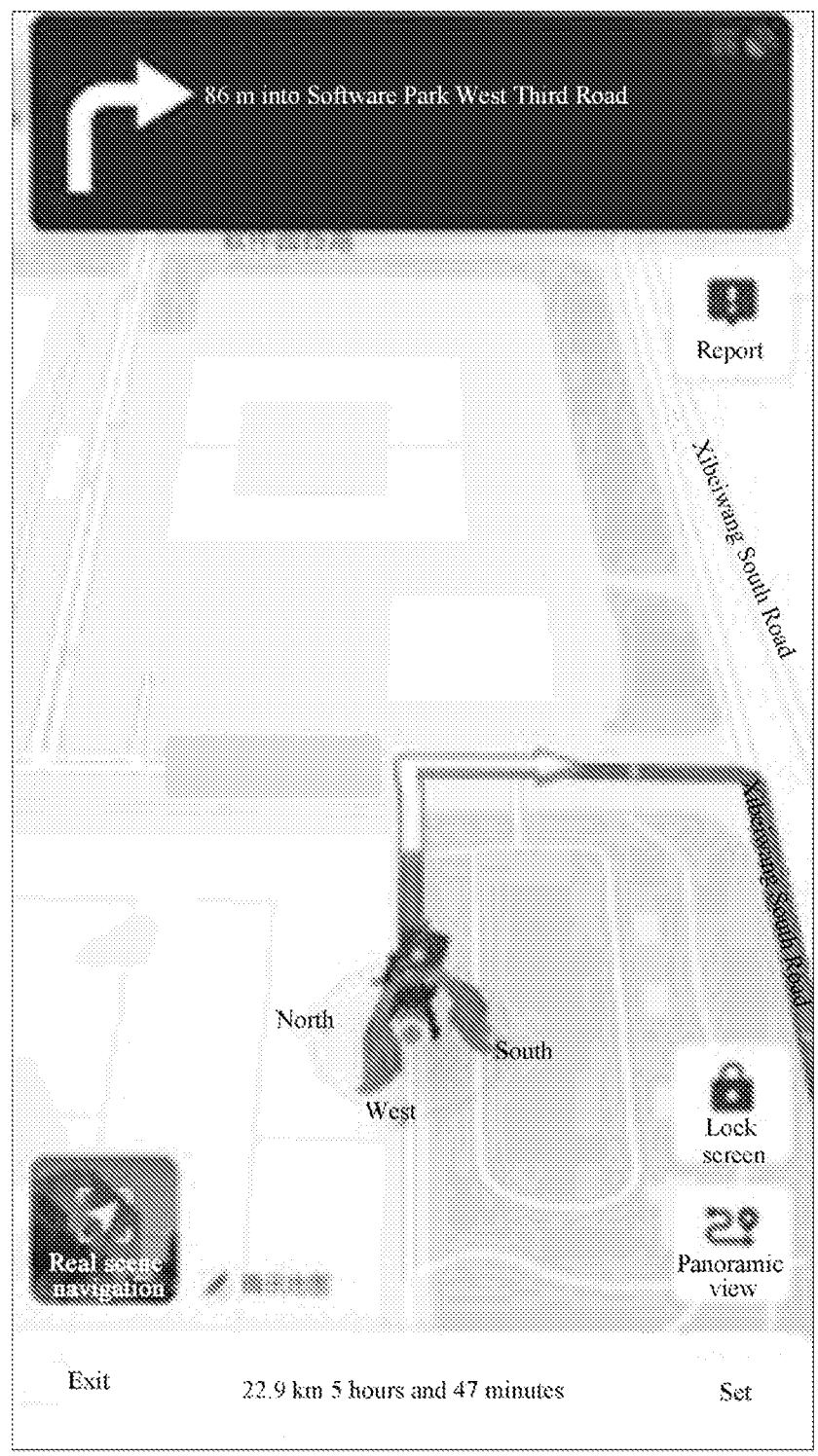
FIG. 18 is a schematic diagram of an interface displaying a dynamic three-dimensional model at the static state according to one or more embodiments.
Figure 19:
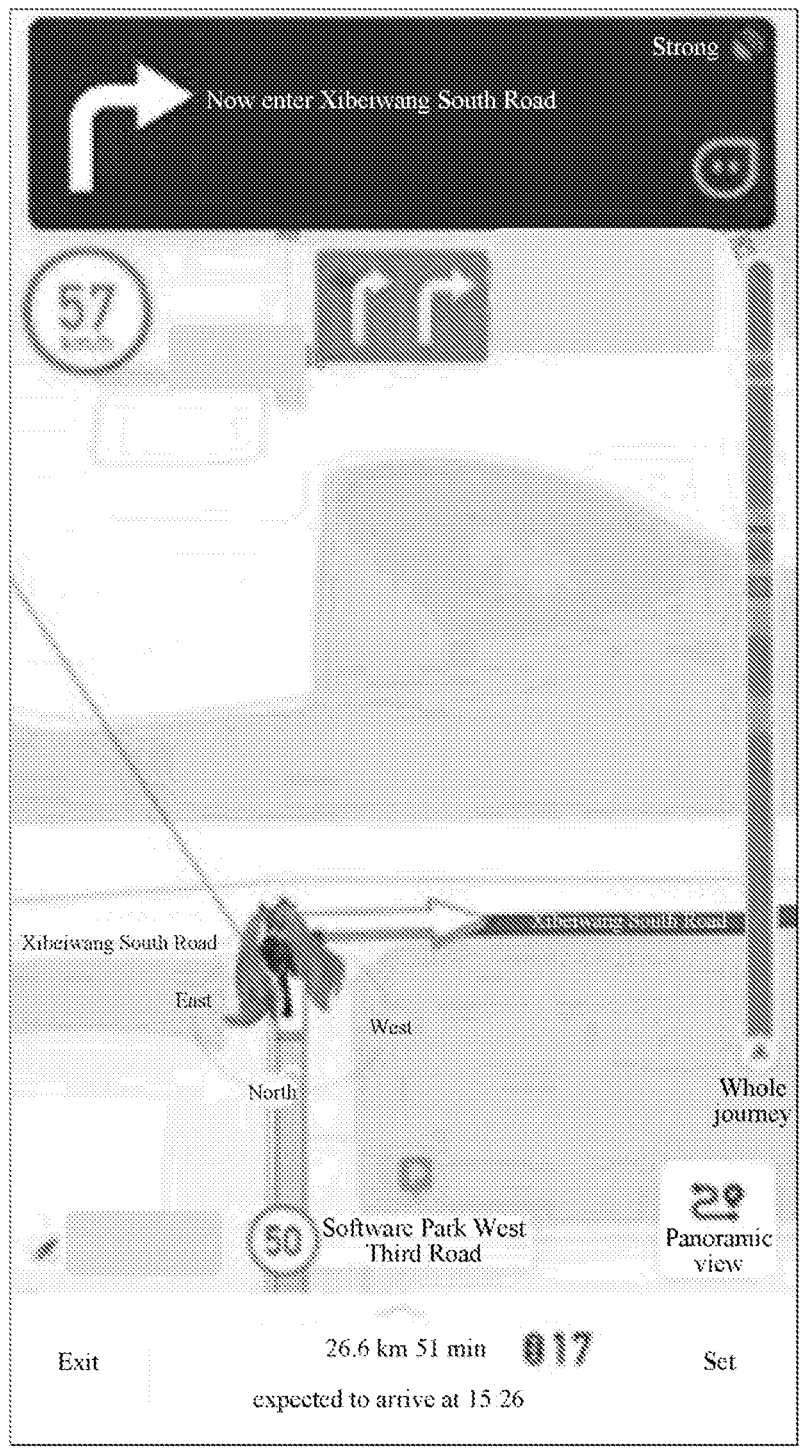
FIG. 19 is a schematic diagram of an interface displaying a dynamic three-dimensional model at the walking state according to one or more embodiments.
Figure 20:
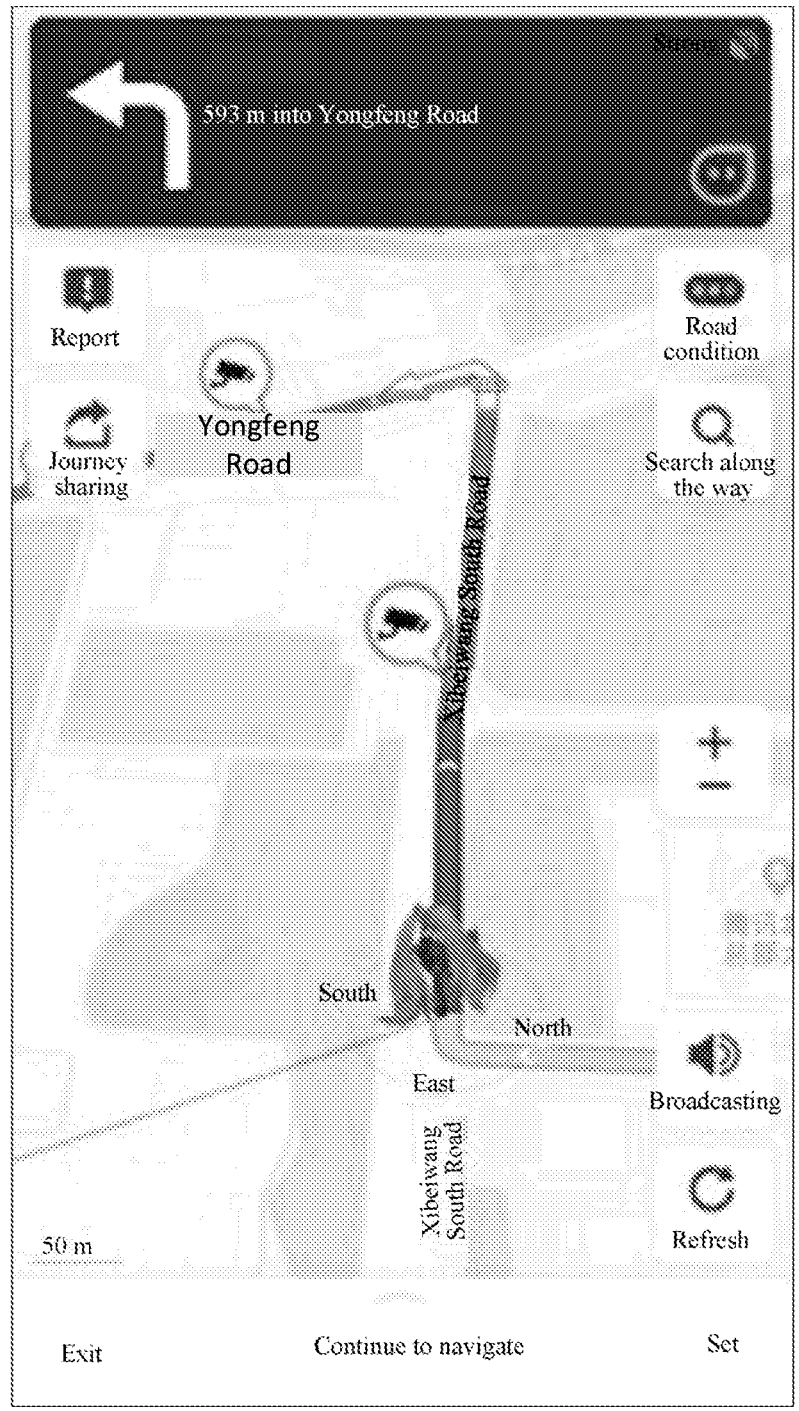
FIG. 20 is a schematic diagram of an interface displaying a dynamic three-dimensional model at the sprinting state according to one or more embodiments.
Figure 21:
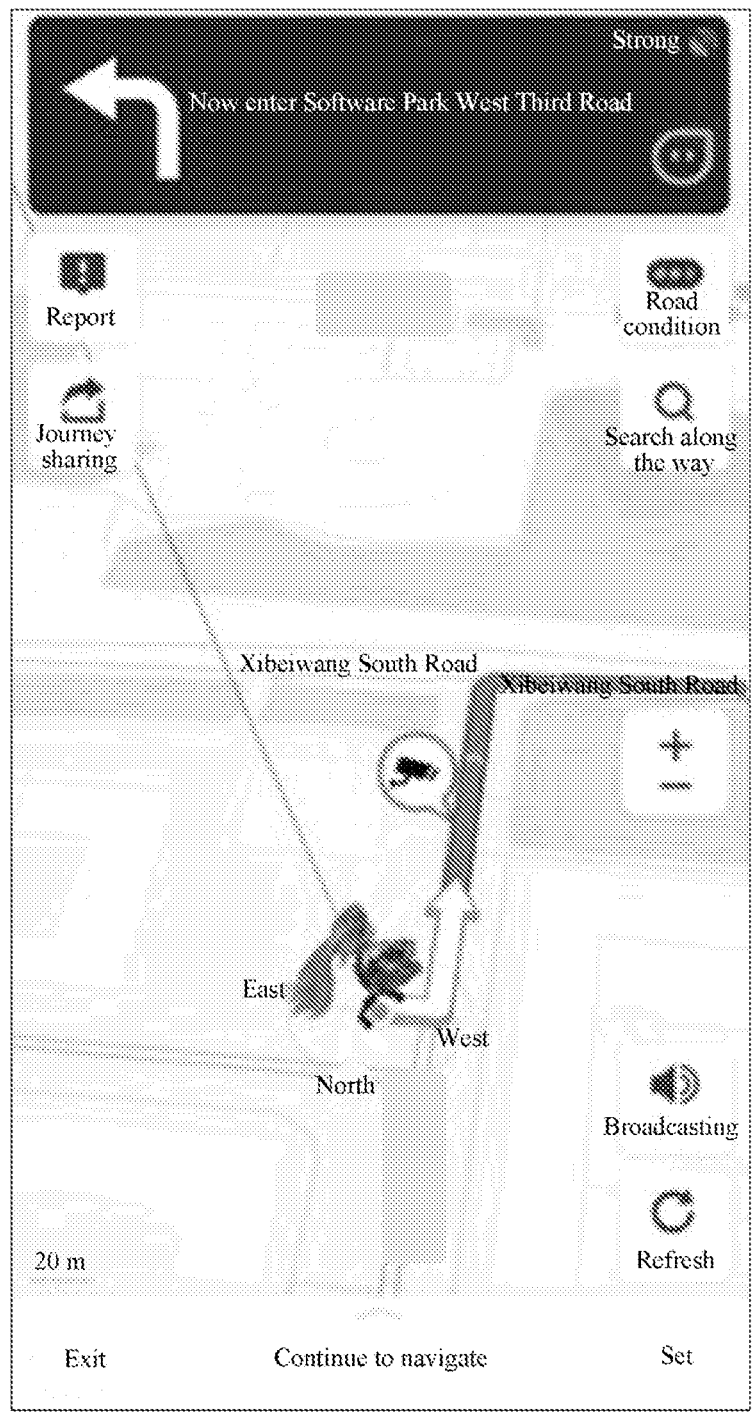
FIG. 21 is a schematic diagram of an interface displaying a dynamic three-dimensional model at the dizziness state according to one or more embodiments.

In one or more embodiments, the display state of the dynamic three-dimensional model is changed accordingly with the change of the moving state of the target object in the navigation process in the navigation route-based navigation process. In this embodiment, the display of different states of the dynamic three-dimensional model is realized according to different moving speeds and road conditions of the navigation target object. In one or more embodiments, the animation display state of the dynamic three-dimensional model is divided into four types. Specifically, when the moving speed of the navigation target object is less than 0.8 m/s, the dynamic three-dimensional model is displayed in a static state, and specifically can be maintained at a standing display state; and as shown in FIG. 18, a displayed 3D person model is displayed in a static state at the position of the navigation target object in the navigation route. When the moving speed of the navigation target object is not less than 0.8 m/s and less than 16.7 m/s, it is considered that the navigation target object is in a low-speed moving state, and the dynamic three-dimensional model is displayed in a walking state; and as shown in FIG. 19, the displayed 3D person model is displayed in a walking state at the position of the navigation target object in the navigation route. When the moving speed of the navigation target object is not less than 16.7 m/s, it is considered that the navigation target object is in a high-speed moving state, and the dynamic three-dimensional model is displayed in a sprinting state; and as shown in FIG. 20, the displayed 3D person model is displayed in a sprinting state at the position of the navigation target object in the navigation route. When the moving speed of the navigation target object is less than 0.8 m/s and the current road condition is congested, it is considered that the navigation target object cannot move normally due to the road congestion, and the dynamic three-dimensional model is displayed in a dizziness state; and as shown in FIG. 21, the displayed 3D person model is displayed in a dizziness state at the position of the navigation target object in the navigation route. In one or more embodiments, the moving speed thresholds of the target object corresponding to various display states such as static, walking, sprinting and dizziness can be dynamically configured according to actual needs.

Figure 22:
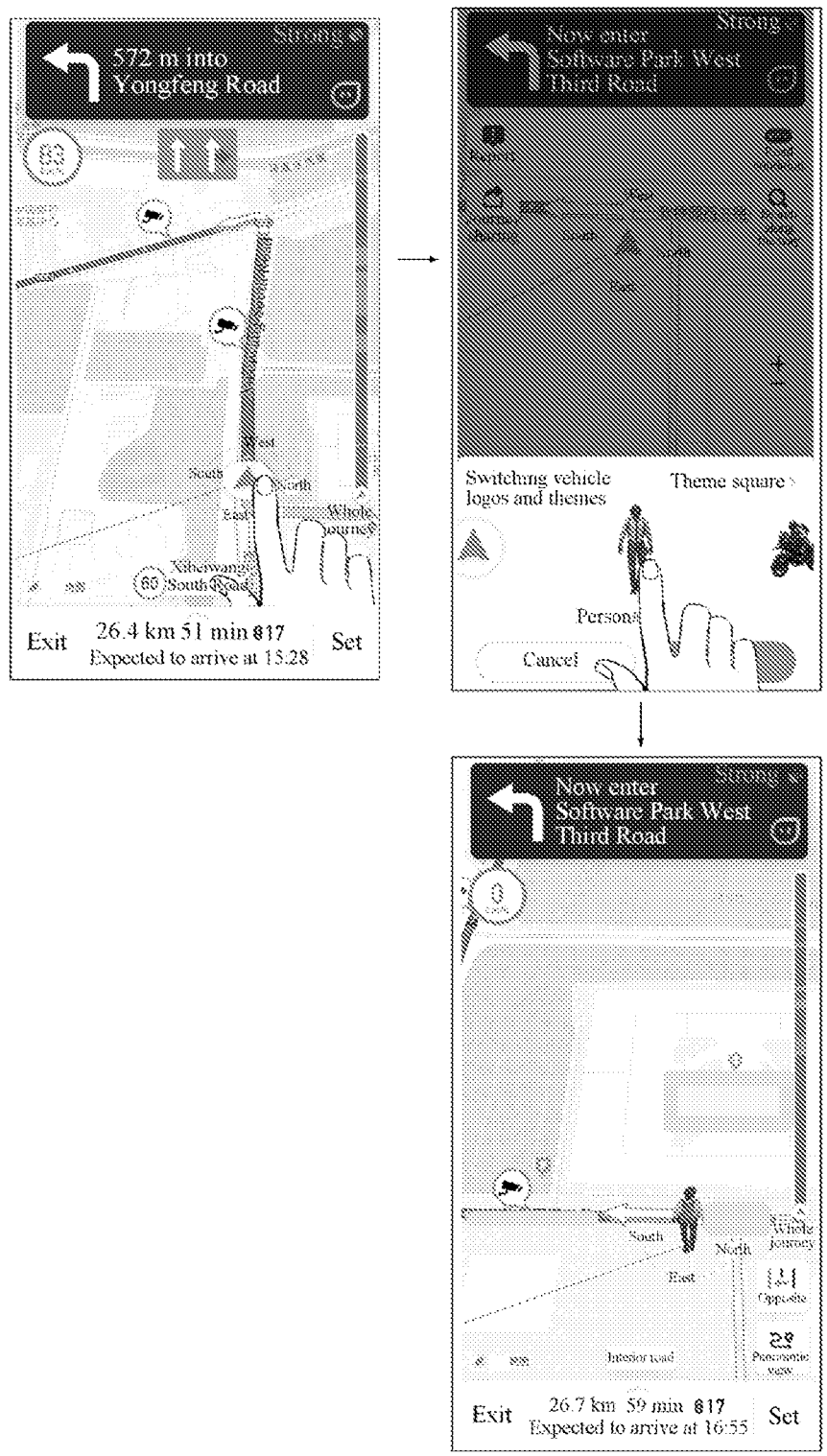
FIG. 22 is a schematic diagram of the change of an interface for switching a dynamic three-dimensional model according to one or more embodiments.

In one or more embodiments, the user can click the dynamic three-dimensional model displayed in the electronic map; a pop-up window of the terminal displays the three-dimensional model list; and the user can switch and update the displayed type of dynamic three-dimensional model in the three-dimensional model list according to actual needs. In one or more embodiments, besides various types of dynamic three-dimensional models, the three-dimensional model list can also include two-dimensional images, so that the switching between the dynamic three-dimensional models and the two-dimensional images can be realized. As shown in FIG. 22, in the vehicle driving navigation, the user clicks an arrow mark indicating a vehicle logo displayed in the navigation route to trigger the switching and updating of the vehicle logo. The user can select the required dynamic three-dimensional model as the vehicle logo to replace the original arrow, and thus, a vehicle can be marked by the selected dynamic three-dimensional model.

Figure 23:
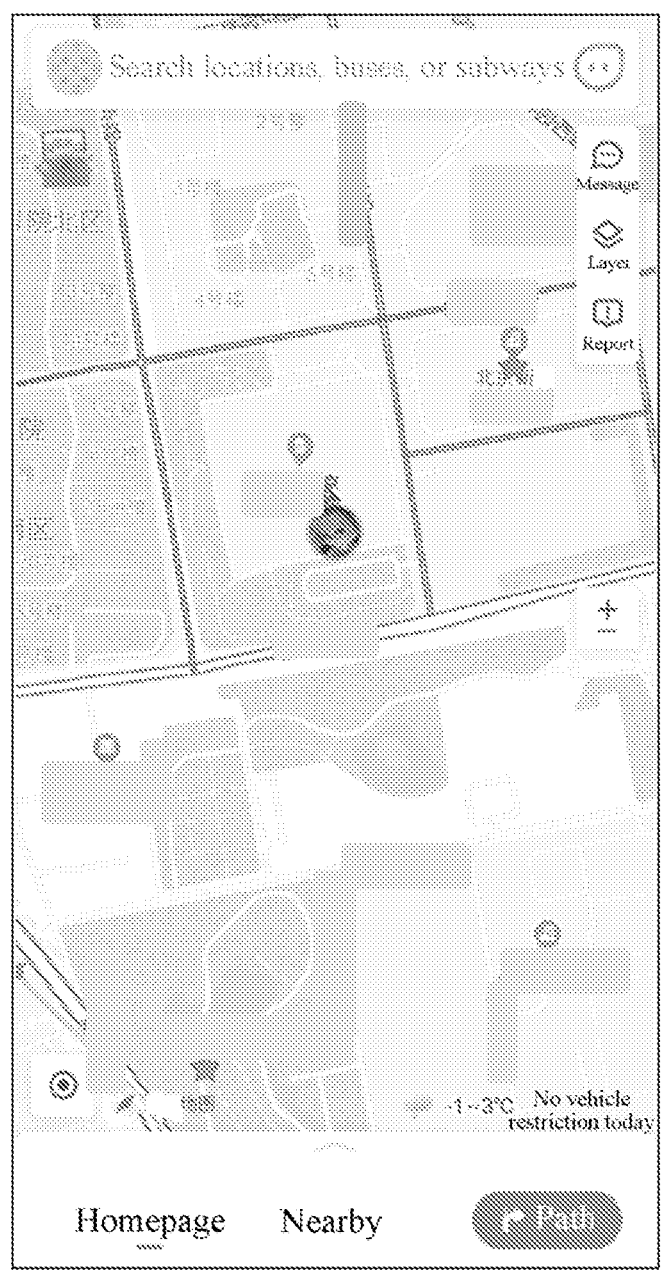
FIG. 23 is a schematic diagram of an interface displaying model marks on the homepage of an electronic map according to one or more embodiments.
Figure 24:
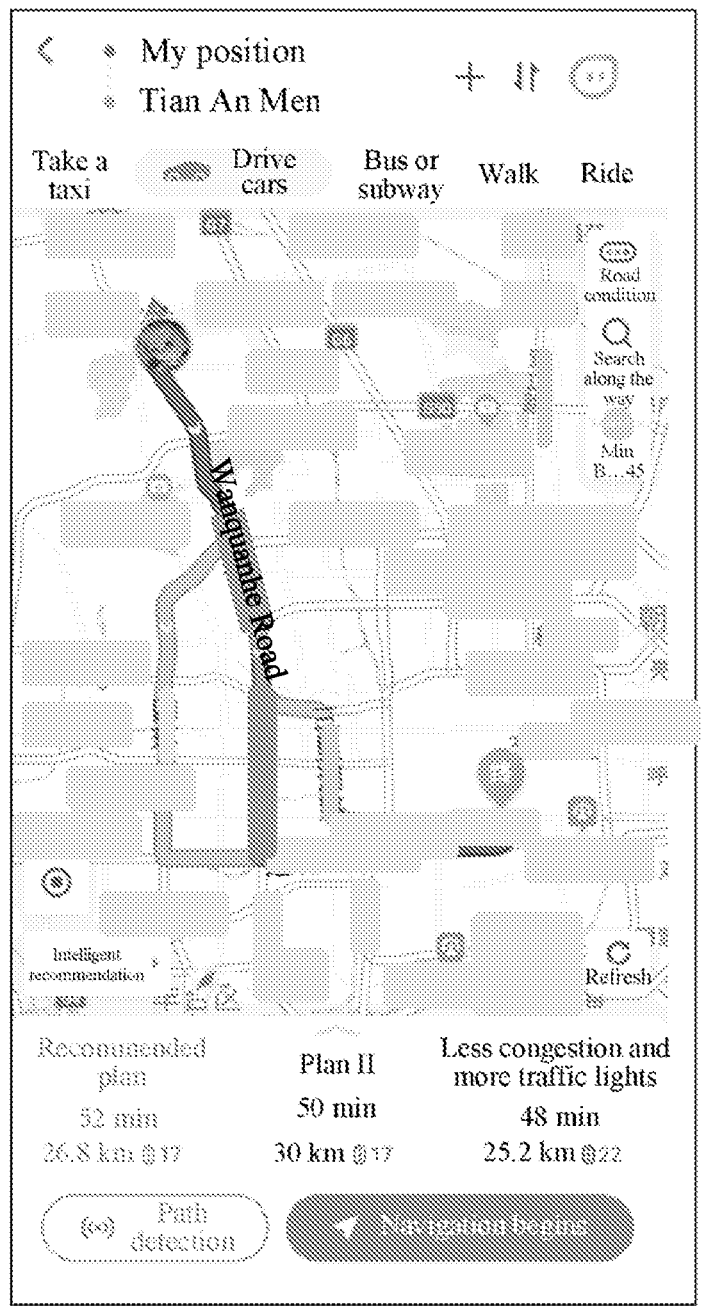
FIG. 24 is a schematic diagram of an interface displaying model marks during route planning in an electronic map in one or more embodiments.
Figure 25:
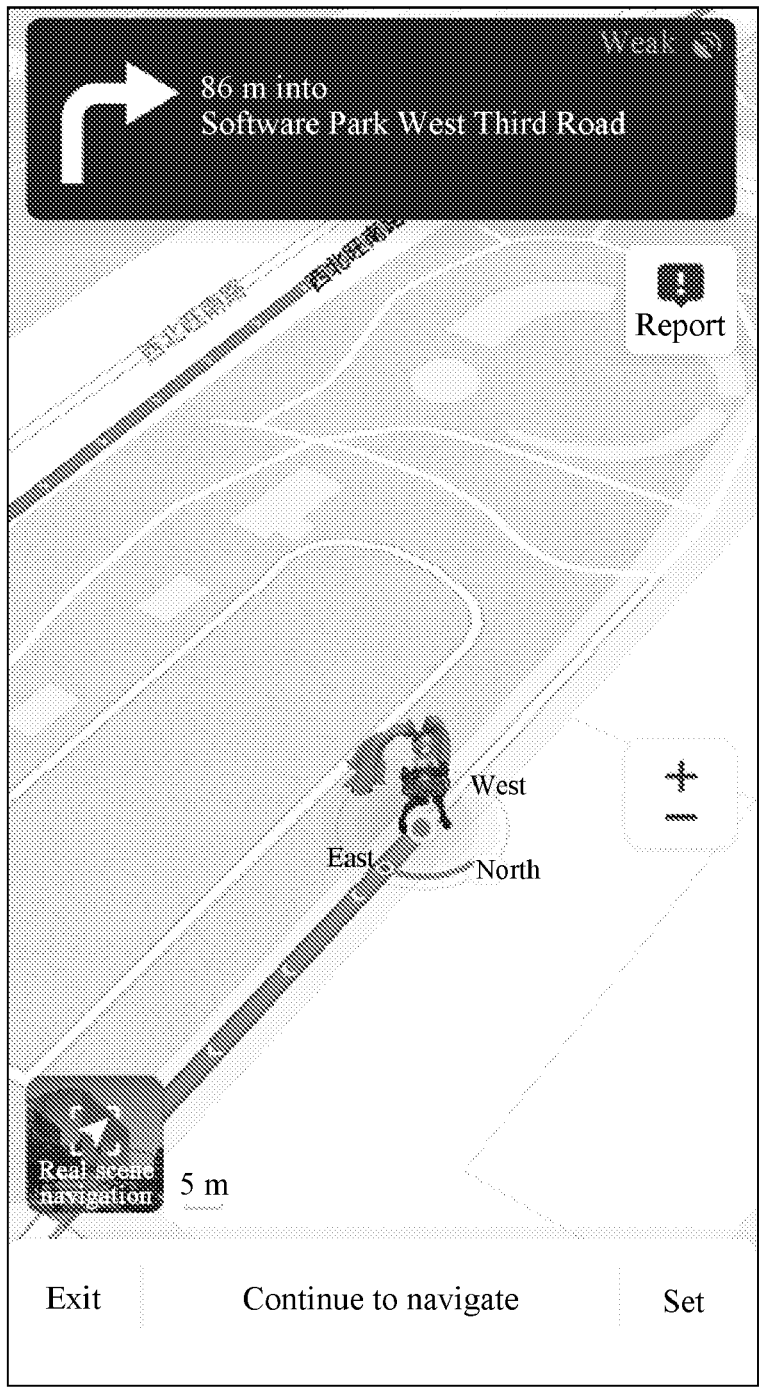
FIG. 25 is a schematic diagram of an interface displaying a dynamic three-dimensional model during route navigation according to one or more embodiments.

In one or more embodiments, in the application of the electronic map, the position of the navigation target object is automatically identified in three dimensions and two dimensions according to different scenes of the map. When the target object is a vehicle, the 3D vehicle logo can be automatically switched with the 2D vehicle logo, the 2D state of the corresponding vehicle logo can be displayed in the 2D base map, and the vehicle logo with a 3D skeleton animation can be displayed in a 3D base map scene. When the 3D vehicle logo displayed in the navigation 3D base map scene is switched to a 2D base map scene such as a route planning page and the homepage of the base map, the vehicle logo is automatically switched to the 2D vehicle logo of the corresponding theme, thus realizing the flexible switching between a three-dimensional identifier and a two-dimensional identifier for map scenes. As shown in FIG. 23, on the home page of the electronic map, the two-dimensional model mark corresponding to the dynamic three-dimensional model is displayed. As shown in FIG. 24, when the electronic map is used for route planning, the two-dimensional model mark corresponding to the dynamic three-dimensional model is displayed. As shown in FIG. 25, during route navigation, a 3D dynamic three-dimensional model is displayed in the electronic map.

In one or more embodiments, the style, size and animation frame rate of a mark identifying the position of the target object can be flexibly configured through configuration files, and thus, functions can be updated directly by modifying or adding configuration files without modifying the code logic by a client. In the specific application, the logic of the configuration files can be as follows:

```
{"modelName": "anqila", //model name being anqila
"speedActions": [{
"speedStart": 0,
"speedEnd": 0.8,
"actionName": "stop"
},//when the moving speed of the target object is in the range of
0-0.8 m/s, the corresponding action is called stop.
{"speedStart": 0.8,
"speedEnd": 999,
"actionName": "run" }//when the moving speed of the target object is
greater than 0.8 m/s and less than 999 m/s, the corresponding action is
called running],
"actions":{ "run": {
"frameStart":40,
"frameEnd":68 },//the frame rate range during the display of running
animations is 40-68 frames per second.
"stop":{"frameStart":0,
"frameEnd":36 }},//the frame rate range during the display of stop
animations is 0-36 frames per second.
"scale": 2.3, //the size is 2.3 units.
"refreshInitiative":1,//activation refreshing
"refreshStrategy":{
"useTimeNotFrame": 0,
"timeParam":24,
"frameParam":0.8 }}//the refresh strategy includes that the refresh time
starts from 0, the refresh time parameter is 24, and the frame rate
parameter is 0.8.
```

In one or more embodiments, if the road ahead is congested and it is determined that the congestion time exceeds the configured time threshold, in order to alleviate the user emotion, the terminal can play safety prompt animations corresponding to the dynamic three-dimensional model and operational activity information, for example, the dynamic three-dimensional model of a certain game is configured, and if the road ahead is congested, when the safety prompt animations for appeasing the user are played, "XX Game gives you a skin coupon, which can be collected at the end of your navigation" are simultaneously broadcast. If the moving speed of the target object is too fast, such as exceeding the speed limit of the current road, the dynamic three-dimensional model can play overspeed danger animations to remind the user to reduce the speed. In addition, the user can also wake up the dynamic three-dimensional model by voice to query information, for example, query traffic restriction information, weather information, passing point information along the way, and the like; and the information obtained by querying can be broadcast by voice by the dynamic three-dimensional model.

In one or more embodiments, a skin interface corresponding to the target object identifier can be provided in the electronic map application of the terminal to switch the types of the target object identifier, and different types of dynamic three-dimensional models can be considered as different skins of the target object identifier. During switching, the skin data and configuration data of various candidate skins of the target object identifier can be obtained from the server, and various skins can be rendered through a rendering model to be displayed on the terminal. In one or more embodiments, the flow of the interactive method based on electronic map in this embodiment involves a client, a base map engine and a skin data background. The client can set a 3D skeleton animation to display the target object identifier; the base map engine renders the skeleton animation; and the skin data background provides services and configuration of model files required by the above skeleton animation. A general theme module of an ISkinApi is extracted from the overall architecture. The API (Application Programming Interface) can be used for the global theme setting of the whole electronic map application, and can also be called by other modules to realize the display and update of the target object identifier.

Figure 26:
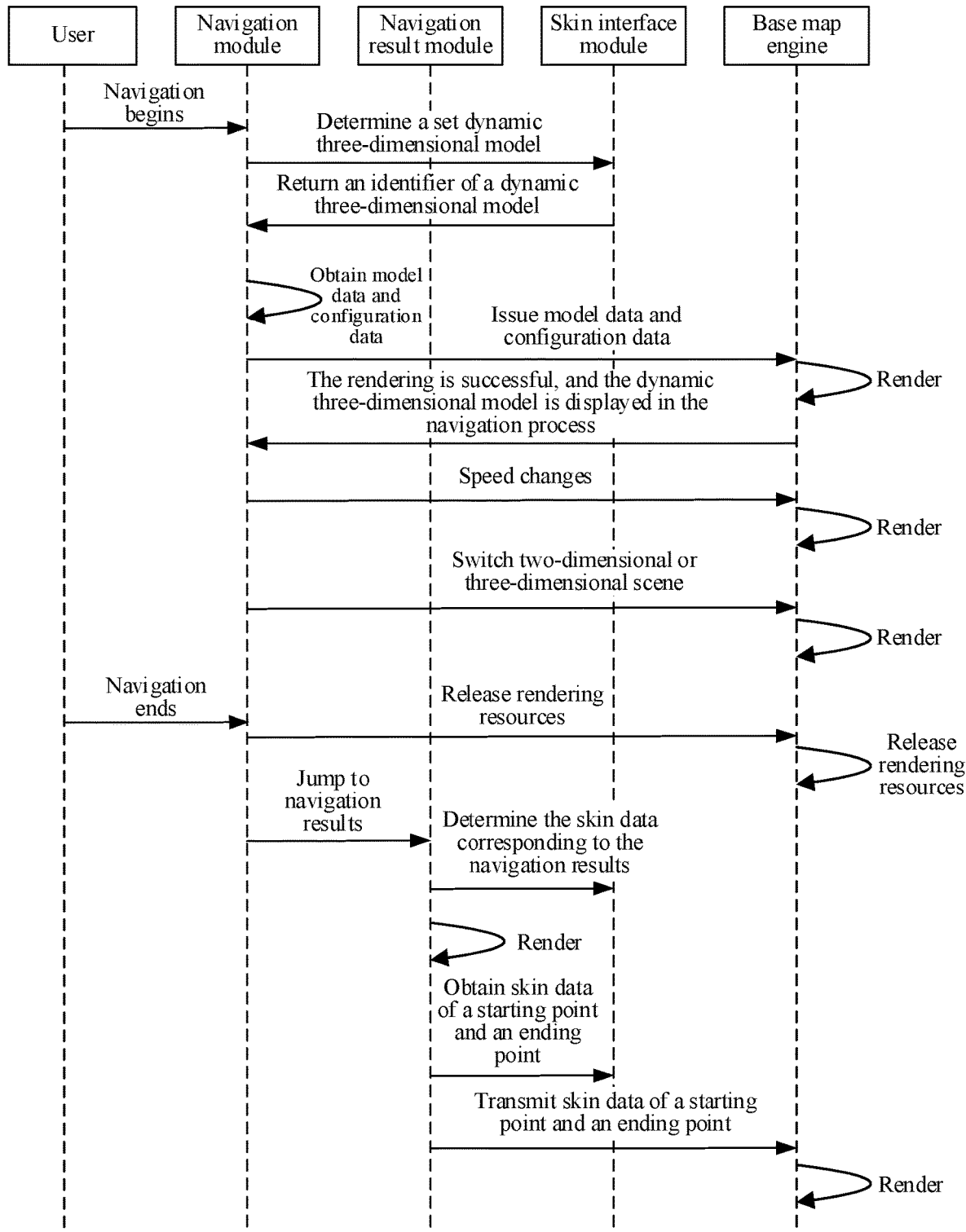
FIG. 26 is a sequence diagram of performing navigation interaction according to one or more embodiments.

In one or more embodiments, as shown in FIG. 26, at the beginning of navigation, the currently set skin type is obtained. If it is a dynamic three-dimensional model, such as a skeleton skin, skeleton skin model files and configuration files are parsed to obtain model data and configuration data, and parameters such as the model data and configuration data are transmitted to the base map engine for rendering. If the moving speed changes in the navigation process, setSkeletonAnimParam is called to set the actions of the skin, including dizziness, running, stopping and the like. When map scenes are switched and 2D/3D switching of a panoramic view, north up, following the front of a vehicle and the like is set, setLocatorType, including Locator_Normal(0), Locator_Model3D(2), and Locator_Model3D_Switch2D(3) is called to control the base map engine for re-rendering After the navigation process ends, it is necessary to release skin model resources and jump to a navigation result interface. A navigation result module is used for obtaining the current skin type and the current skin animation, and the terminal uses a lottie component to play the rendered animation. The navigation result module is used for drawing the trajectory, obtaining the image resources of the starting point and ending point of the current skin, and setting and rendering the current image resources.

In one or more embodiments, if the dynamic display state of the dynamic three-dimensional model is realized based on a skeleton animation technology, the skeleton animation algorithm can be further optimized, so that the utilization rate of the navigation memory is reduced, and thus, more equipment can be supported. In the navigation process, the base map engine and the skeleton animation engine are used for rendering alternately, which has a great impact on the performance and compatibility of the terminal. Therefore, it is considered to optimize the skeleton animation algorithm to reduce the utilization rate of the memory while the function is realized. Through the optimal control of the skeleton animation, the skeleton animation can run in each terminal equipment with high performance, memory saving and power saving.

Figure 27:
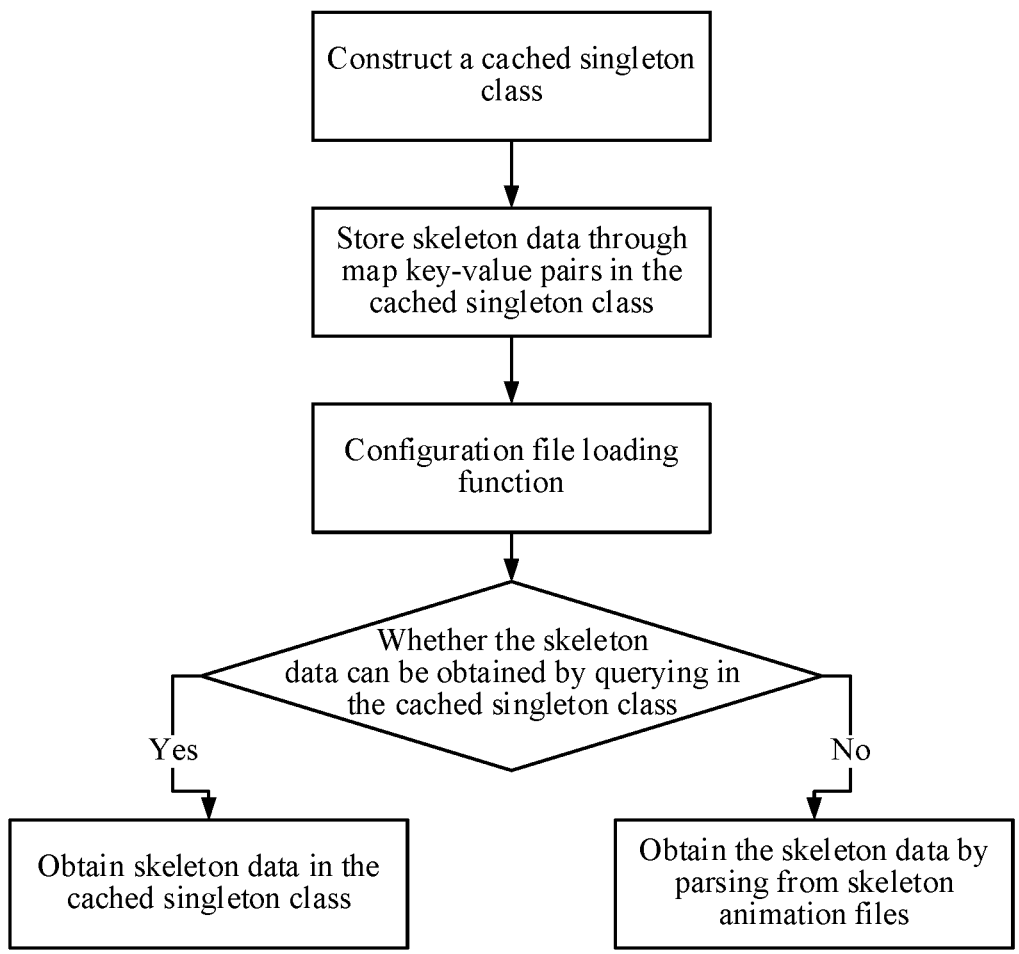
FIG. 27 is a schematic flowchart of adding the cache logic of the skeleton animations according to one or more embodiments.

In one or more embodiments, cache logic for the skeleton animation can be added. As shown in FIG. 27, the cached singleton class SpineDataCahce is constructed, the skeleton data and the corresponding file name are stored as key values in a key-value pair map, and the initWithBinaryFile function used for loading files in the official file skeletonRender.cpp is modified, so that when the skeleton data is queried, the skeleton data is searched from the cache first, and then the skeleton animation file is loaded if the skeleton data cannot be found. In one or more embodiments, no cache processing for animation files is provided in codes provided by an official application framework Spine; and when multiple animations are loaded at the same time, frames are stuck, and the larger the amount of animation data, the more severely the frames are stuck. Therefore, considering that there is no difference between loading 100 identical animations and loading one animation, the efficiency can be improved by 99.99% by increasing the cache logic of the skeleton animation. Firstly, a cached singleton class is added to the skeletonRender.h file of the skeleton animation. Specifically, the skeleton data and the corresponding file name are stored as Key values in the key-value pair map; the cache logic is added to the official file; and the initWithBinaryFile function for loading files in the official file skeletonRender.cpp is modified, thus, when the skeleton data is queried, the skeleton data can be searched from the cache first, if the skeleton data cannot be found, the skeleton animation files including atlas files and skel files are loaded, and thus, the skeleton data are parsed out. The spSkeletonData type skeleton data is put into a cache, thereby realizing the temporary caching of the skeleton data. When the target object exits the navigation, the skeleton data is stored in the cached singleton spineCache, and all the same animations share the same skeleton data, so only when the target object exits the map application, SpineDataCahce:clear( ) is called to release the skeleton data in the cached singleton spineCache.

In one or more embodiments, the frame rate can also be dynamically reduced according to the current memory state and the current speed. In one or more embodiments, the skeleton animation has four states, including a static state, a walking state, a sprinting state and a dizziness state. In one or more embodiments, for the static state and the dizziness state, it is not necessary to determine the available state of the memory, and the frame rate is directly adjusted to less than 20 to ensure the reduction of the utilization rate of the memory at the static state. For the walking state, according to whether the available memory reaches half of the total memory or not, if the available memory reaches more than half, the frame rate is not reduced, otherwise, the frame rate is reduced; for the sprinting state, according to whether the available memory reaches half of the total memory or not, if the available memory reaches more than half, the frame rate is not reduced, otherwise, the frame rate is reduced; and if the frame rate is reduced for more than 10 seconds, running at a high frame rate is resumed for 20 seconds, and alternative running is performed, thus ensuring the effect of the skeleton animations and saving the computing resources of terminals such as the memory and a CPU.

Figure 28:
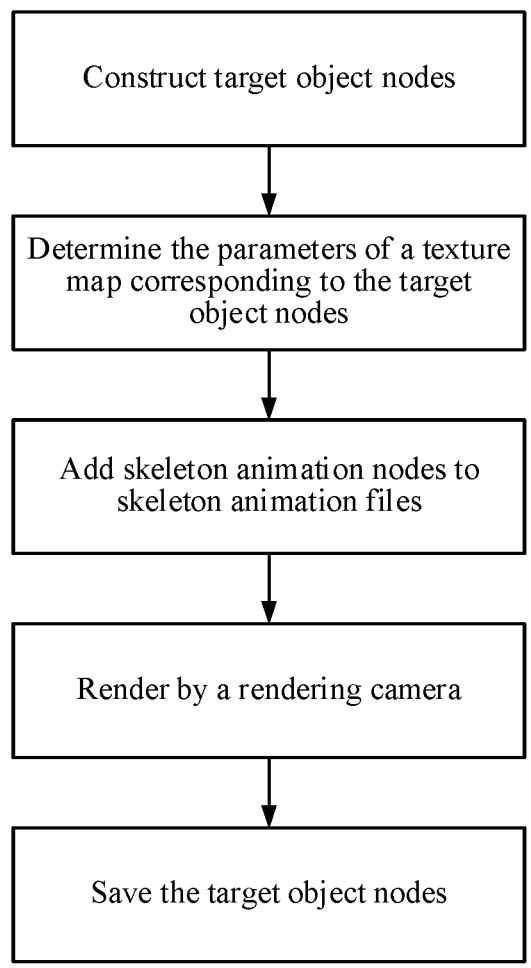
FIG. 28 is a schematic flowchart of rendering to obtain a texture map according to one or more embodiments.

In one or more embodiments, in the low-end terminal, the 3D skeleton animation is replaced with a static diagram in a resource Hook mode to reduce the memory and CPU usage. In one or more embodiments, as shown in FIG. 28, target object nodes are constructed based on skeleton animation files, and the target object nodes generated by the same skeleton animation files are uniformly cached. The size parameter of a texture map RenderTexture is determined; the attribute information of the target object nodes is set according to the size parameter; the target object nodes are added to the root directory of the skeleton animation file corresponding to the texture map; and after the texture map RenderTexture is obtained by activating a rendering camera, the attributes and positions of the target object nodes are reset, and the target object node are saved. In one or more embodiments, considering that as long as a low-end machine can display the static pictures corresponding to the animations, the static pictures can be generated in a dynamic way without making a batch of static resources with the same content. In one or more embodiments, a RenderCamera can be added to the scene, then the corresponding skeleton animation file Spine is dynamically rendered into a texture map RenderTexture, then the sprite element of cc. SpriteFrame is generated by using the texture map, and the sprite element is hung on a cc.Node which is also dynamically created. Then a Spine node is used as a parent node of the cc.Node, and finally the Spine component is hidden, so that the low-end terminal can use the resource Hook mode to replace the 3D skeleton animation with the static map.

Figure 29:
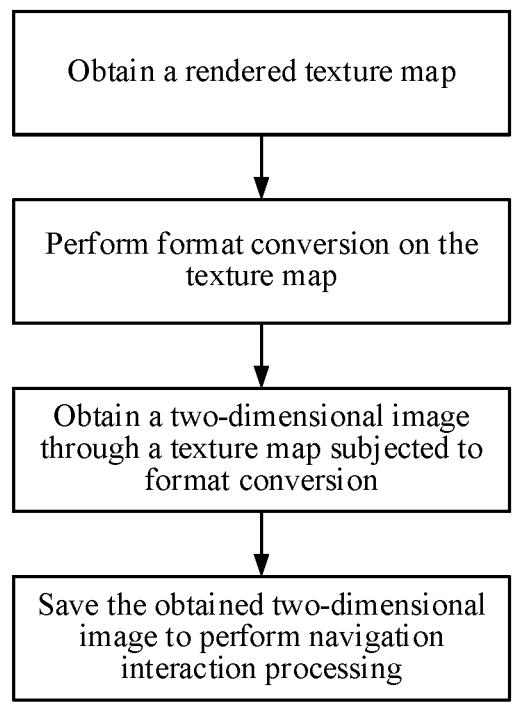
FIG. 29 is a schematic flowchart of performing format conversion on a texture map according to one or more embodiments.

In one or more embodiments, the 3D skeleton animation is replaced by a static picture, which can save the computational resource overhead of skeleton operation and rendering of Spine; and the rendering processing is simple and direct, which can effectively reduce the computational resource consumption when there are many and complicated Spines. In the base map engine, the dynamic map combination mechanism relies on updating maps, and cannot support RenderTexture. Only the maps generated based on images can be updated to an atlas, so if you want to use the dynamic map combination function of the system conveniently, the rendered RenderTexture can be converted into a HTMLImageElement map, then Texture2D is generated based on this and the previous RenderTexture is destroyed, so that Texture2D can automatically participate in the automatic map combination of the system, thus achieving the purpose of further optimizing DrawCall. As shown in FIG. 29, a canvas is created, and the rendered texture map is obtained. The texture map is subjected to format conversion to obtain a two-dimensional image of HTMLImageElement, and navigation interaction processing is performed through the two-dimensional image.

The traditional identification of the position of the target object through a 2D plane picture lacks interestingness and authenticity, and the sense of reality is not strong. However, the identification of the position of the target object through a static 3D model lacks dynamic sense and has poor interactivity, and the size of the 3D model is relatively fixed. Once the size is determined, the 3D model cannot be dynamically adjusted. In a scene of navigation that requires relatively high accuracy, the oversize vehicle logo is easy to block some key route information and road identifiers, and thus, the navigation efficiency is affected. In one or more embodiments, the skeleton animation is combined with the 3D model to realize a target object display scheme with strong sense interaction sense and dynamic sense, which improves the navigation experience of the user. In the navigation process, the 3D model that identifies the position of the target object can also make corresponding actions according to the current scene. In addition, in the loading process of the skeleton animation model, the model style adopts a Json data configurable way, which supports the dynamic adjustment of the model size and animation form. New skeleton animation display can be realized only by modifying the configuration file and model animation resources, and all parties do not need to modify the logic, which can improve the use efficiency. Moreover, by controlling the size of the model, the problem of blocking routes and route identifiers caused by the oversize 3D model can be avoided, and the amount of information presented in the navigation process can be increased, which is beneficial to improving the use efficiency and the user experience.

It is to be understood that, although the steps in the flowcharts of FIG. 2, FIG. 13, and FIG. 26 to FIG. 29 are sequentially displayed according to indication of arrows, the steps are not necessarily sequentially performed in the sequence indicated by the arrows. Unless otherwise clearly specified in this specification, the steps are performed without any strict sequence limit, and may be performed in other sequences. In addition, at least some steps in FIG. 2, FIG. 13, and FIG. 26 to FIG. 29 may comprise a plurality of substeps or a plurality of stages. The substeps or the stages are not necessarily performed at the same moment, and instead may be performed at different moments. The substeps or the stages are not necessarily performed sequentially, and instead may be performed in turn or alternately with another step or at least some of substeps or stages of another step.

Figure 30:
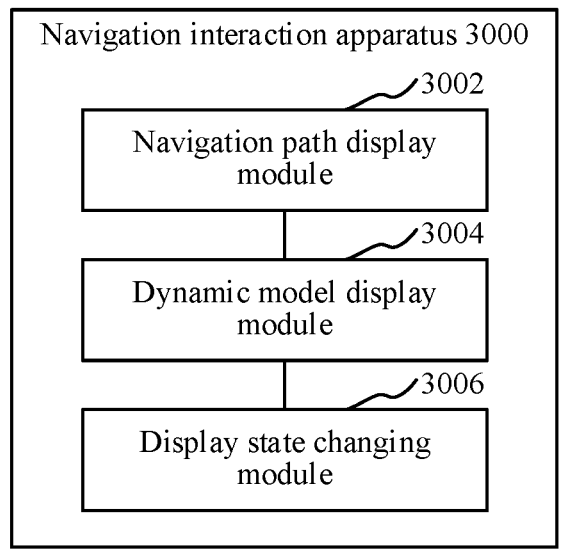
FIG. 30 is a structural block diagram of an electronic map-based interactive apparatus according to one or more embodiments.

In one or more embodiments, as shown in FIG. 30, an electronic map-based interactive apparatus 3000 is provided, and can adopt a software module or a hardware module, or a combination of the two forms part of a computer device, and the apparatus specifically comprises: a navigation route display module 3002, a dynamic model display module 3004, and a display state changing module 3006.

A navigation route display module 3002 is configured to display a navigation route for a target object in a display interface of an electronic map;

a dynamic model display module 3004 is configured to display a dynamic three-dimensional model with a changeable display state at a target position in the navigation route, the target position indicating the current position of the target object, and the current display state of the dynamic three-dimensional model being matched with the current moving state of the target object; and a display state changing module 3006 is configured to change the display state of the dynamic three-dimensional model accordingly with the change of the moving state of the target object in the navigation process in the navigation route-based navigation process.

In one or more embodiments, the display state changing module 3006 is further configured to change the display state of the dynamic three-dimensional model into a display state corresponding to the changed moving state of the target object when the moving state of the target object changes in the navigation route-based navigation process; and the change of the moving state of the target object corresponds to the change of the moving speed of the target object.

In one or more embodiments, the display state changing module 3006 further includes a static display module, a first moving display module and a second moving display module; the static display module is configured to change the display state of the dynamic three-dimensional model into a static display state when the moving speed of the target object is less than a first speed threshold; the first moving display module is configured to change the display state of the dynamic three-dimensional model into the display state of moving at a first frequency when the moving speed of the target object is not less than the first speed threshold and less than a second speed threshold; the second speed threshold is greater than the first speed threshold; the second moving display module is configured to change the display state of the dynamic three-dimensional model into the display state of moving at a second frequency when the moving speed of the target object is not less than the second speed threshold; and the second frequency is greater than the first frequency.

In one or more embodiments, the display state changing module further includes a dizziness display module, which is configured to change the display state of the dynamic three-dimensional model into a dizziness display state when the moving speed of the target object is less than the first speed threshold, and the corresponding position of the dynamic three-dimensional model in the navigation route is in a congested road condition state.

In one or more embodiments, the display state changing module 3006 is further configured to change the display state of the dynamic three-dimensional model to a display state prompting to adjust the moving speed when the moving speed of the target object exceeds the speed limit of a road corresponding to the position of the dynamic three-dimensional model.

In one or more embodiments, the display state changing module 3006 further includes a deceleration prompting display module and an acceleration prompting display module; the deceleration prompting display module is configured to change the display state of the dynamic three-dimensional model into a display state prompting deceleration when the moving speed of the target object exceeds a first safe speed of the road corresponding to the position of the dynamic three-dimensional model; the acceleration prompting display module is configured to change the display state of the dynamic three-dimensional model into a display state prompting acceleration when the moving speed of the target object is lower than a second safe speed of the road corresponding to the position of the dynamic three-dimensional model; and the second safe speed is less than the first safe speed.

In one or more embodiments, the display state changing module further includes an information display module, which is configured to display at least one of safety prompt information about moving safety matched with the dynamic three-dimensional model and activity description information about the dynamic three-dimensional model when the corresponding position of the dynamic three-dimensional model in the navigation route is in a congested road condition state and the congestion exceeds a congestion time threshold.

In one or more embodiments, the display state changing module further includes a model list display module, a three-dimensional model selection module, and a three-dimensional model replacement module; the model list display module is configured to display a three-dimensional model list including a plurality of types of dynamic three-dimensional models in response to a model type triggering operation; the three-dimensional model selection module is configured to select a dynamic three-dimensional model of a target type in response to a selection operation triggered in the three-dimensional model list; and the three-dimensional model replacement module is configured to replace the dynamic three-dimensional model by the dynamic three-dimensional model of the target type.

In one or more embodiments, the display state changing module further includes a route planning triggering module and a planning route display module; the route planning triggering module is configured to display a route planning operation area corresponding to the electronic map in response to a route planning triggering operation triggered in the electronic map; the planning route display module is configured to display a planning route for the target object generated based on a route planning operation in the electronic map in response to the route planning operation triggered in the route planning operation area; a model mark corresponding to the dynamic three-dimensional model is displayed at a positioning position in the planning route; and the positioning position indicates the current position of the target object.

In one or more embodiments, the navigation route display module 3002 further includes a navigation triggering module and a navigation display module; the navigation triggering module is configured to control the electronic map to enter the navigation mode in response to the navigation triggering operation triggered for the planning route; and the navigation display module is configured to display the navigation route for the target object determined from the planning route based on the navigation triggering operation in the navigation mode of the electronic map.

In one or more embodiments, the navigation route display module further includes a two-dimensional scene display module, which is configured to display a model mark corresponding to the dynamic three-dimensional model at a positioning position in the electronic map when the electronic map is in a two-dimensional map scene; and the positioning position indicates the current position of the target object.

In one or more embodiments, the navigation route display module further includes a voice instruction responding module, which is configured to display feedback information matched with a voice control instruction in a perceptual form by the dynamic three-dimensional model in response to the voice control instruction triggered for the dynamic three-dimensional model.

In one or more embodiments, the navigation route display module further includes an actual route display module, which is configured to display an actual moving route corresponding to the navigation process when the navigation route-based navigation process ends; model marks corresponding to the dynamic three-dimensional model are displayed at a starting position and an ending position in the actual moving route respectively.

In one or more embodiments, the navigation route display module further includes a parameter configuration triggering module, a target parameter display module and a configuration updating module; the parameter configuration triggering module is configured to display a model parameter configuration item corresponding to the dynamic three-dimensional model in response to a parameter configuration triggering operation triggered for the dynamic three-dimensional model; the target parameter display module is configured to display target model parameters set by a parameter configuration operation in response to the parameter configuration operation triggered in the model parameter configuration item; and the configuration updating module is configured to display the dynamic three-dimensional model after configuration updating of the dynamic three-dimensional model by the target model parameters in response to a confirmation operation triggered by the target model parameters.

In one or more embodiments, the navigation route display module further includes a navigation data acquisition module and a data rendering module; the navigation data acquisition module is configured to acquire navigation data corresponding to the navigation route when a navigation triggering instruction triggered for the electronic map is received; and the data rendering module is configured to perform rendering processing based on the navigation data and the model data of the dynamic three-dimensional model, so as to display the dynamic three-dimensional model with the changeable display state at the current position of the target object in the displayed navigation route.

In one or more embodiments, the data rendering module further includes a cache data set querying module, a model data acquisition module and a rendering processing module; the cache data set querying module is configured to querying a model cache data set corresponding to the electronic map; the model data acquisition module is configured to acquire the model data of the dynamic three-dimensional model from the model cache data set when the model cache data set includes the model data of the dynamic three-dimensional model; and the rendering processing module is configured to generate a navigation route according to the navigation data, and render the model data into the navigation route, so as to display the dynamic three-dimensional model with the changeable display state at the current position of the target object in the navigation route.

In one or more embodiments, the navigation route display module further includes a resource state determining module and a frame rate adjusting module; the resource state determining module is configured to determine the resource saturation state of a terminal corresponding to the electronic map; and the frame rate adjusting module is configured to dynamically adjusting the frame rate of the dynamic three-dimensional model according to the resource saturation state and the moving state of the target object.

In one or more embodiments, the navigation route display module further includes an actual moving data acquisition module, a model mark acquisition module and a model mark rendering module; the actual moving data acquisition module is configured to acquire actual moving data corresponding to the navigation process when the navigation route-based navigation process ends; the model mark acquisition module is configured to acquire the model marks corresponding to the dynamic three-dimensional model; and the model mark rendering module is configured to generate an actual moving route according to the actual moving data, and render the model marks to the starting position and the ending position in the actual moving route.

In one or more embodiments, the navigation route display module further includes a three-dimensional model diagram acquisition module and a three-dimensional model diagram display module; the three-dimensional model diagram acquisition module is configured to acquire a three-dimensional model diagram matched with the dynamic three-dimensional model when the terminal corresponding to the electronic map does not meet the dynamic model display condition; and the three-dimensional model diagram display module is configured to display the three-dimensional model diagram at the current position of the target object in the navigation route.

For a specific limitation on the electronic map-based interactive apparatus, reference can be made to the limitation on the interactive method based on electronic map above. The modules in the electronic map-based interactive apparatus may be implemented entirely or partially by software, hardware, or a combination thereof. The foregoing modules may be built in or independent of a processor of a computer device in a hardware form, or may be stored in a memory of the computer device in a software form, so that the processor calls and performs an operation corresponding to each of the foregoing modules.

Figure 31:
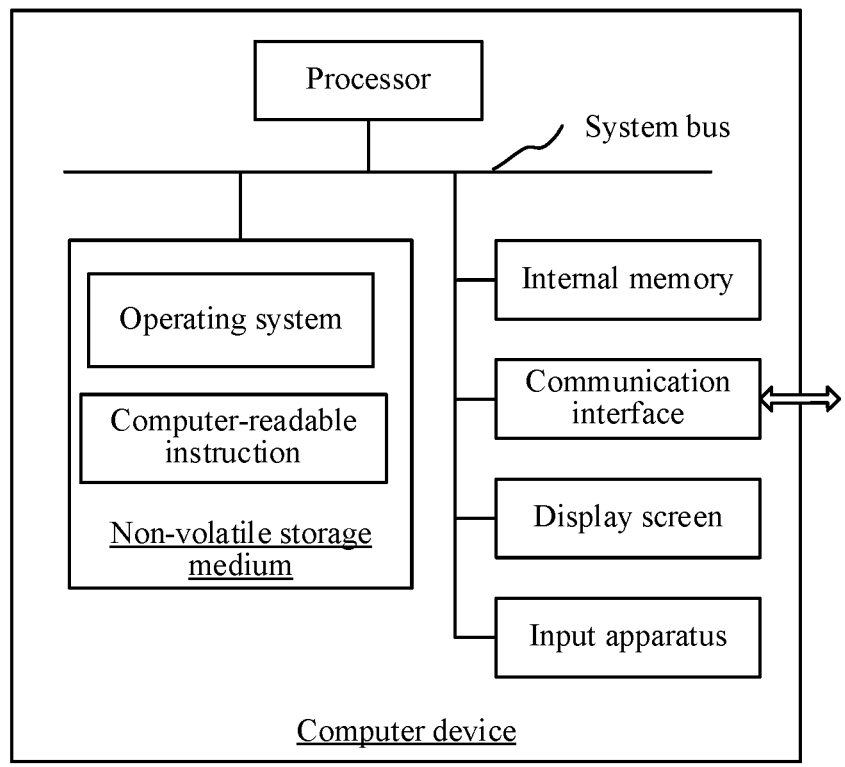
FIG. 31 is a diagram of a computer device according to one or more embodiments.

In one or more embodiment, a computer device is provided. The computer device may be a terminal, and an internal structure diagram thereof may be shown in FIG. 31. The computer device comprises a processor, a memory, a communication interface, a display screen, and an input apparatus that are connected by using a system bus. The processor of the computer device is configured to provide computing and control capabilities. The memory of the computer device comprises a non-volatile storage medium and an internal memory. The non-volatile storage medium stores an operating system and computer-readable instructions. The internal memory provides an environment for running of the operating system and the computer readable instruction in the non-volatile storage medium. The communication interface of the computer device is used for wired or wireless communication with an external terminal, and the wireless mode can be realized by WIFI, operator network, NFC (Near Field Communication) or other technologies. The computer-readable instruction is executed by the processor to implement an interactive method based on electronic map. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like. A person skilled in the art may understand that, the structure shown in FIG. 31 is only a block diagram of a part of a structure related to a solution of this application and does not limit the computer device to which the solution of this application is applied. Specifically, the computer device may comprise more or fewer members than those in the drawings, or comprise a combination of some members, or comprise different member layouts.

In one or more embodiments, a computer device is provided, comprising: a memory and one or more processors, the memory stores computer-readable instructions, and the computer-readable instructions, when executed by the processors, cause the one or more processors to perform the steps in the foregoing method embodiments.

In one or more embodiments, one or more non-volatile readable storage media storing computer-readable instructions are provided, and the computer-readable instructions, when executed by one or more processors, cause the one or more processors to perform the steps in the foregoing method embodiments.

In one or more embodiments, a computer program product or a computer program is provided. The computer program product or the computer program comprises computer readable instructions, and the computer readable instructions are stored in a computer-readable storage medium. The processor of the computer device reads the computer-readable instructions from the computer-readable storage medium, and the processor executes the computer-readable instructions, to cause the computer device to perform the steps in the method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may comprise at least one of a non-volatile memory and a volatile memory. The non-volatile memory may comprise a read-only memory (ROM), a magnetic tape, a floppy disk, a flash memory, an optical memory, and the like. The volatile memory may comprise a random access memory (RAM) or an external cache. For the purpose of description instead of limitation, the RAM is available in a plurality of forms, such as a static RAM (SRAM) or a dynamic RAM (DRAM). The technical features in the foregoing embodiments may be combined in different manners to form other embodiments. For concise description, not all possible combinations of the technical features in the embodiment are described. However, provided that combinations of the technical features do not conflict with each other, the combinations of the technical features are considered as falling within the scope recorded in this specification. The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. An interactive method based on electronic map, performed by a computer device and comprising:
    displaying a navigation route for a target object in a display interface of an electronic map;
    displaying a dynamic three-dimensional model at a target position in the navigation route, the target position indicating a current position of the target object, and a current display state of the dynamic three-dimensional model corresponding to the current moving state of the target object;
    changing a display state of the dynamic three-dimensional model in response to a change of the moving state of the target object in a navigation process associated with the navigation route;
    determining a resource saturation state of a terminal corresponding to the electronic map; and
    dynamically adjusting a frame rate of the dynamic three-dimensional model according to the resource saturation state and the moving state of the target object, comprising:
        in response to the moving state of the target object indicating a first moving speed, adjusting the frame rate of the three-dimensional model to a first frame rate;
        in response to the moving state of the target object indicating a second moving speed greater than the first moving speed and the resource saturation state being below a saturation threshold, maintaining the frame rate of the three-dimensional model at a second frame rate higher than the first frame rate.

2. The method according to claim 1, wherein the changing the display state of the dynamic three-dimensional model in response to the change of the moving state of the target object in the navigation process associated with the navigation route comprises:
    changing the display state of the dynamic three-dimensional model into a display state corresponding to the changed moving state of the target object when the moving state of the target object changes in the navigation process, wherein the change of the moving state of the target object corresponds to a change of a moving speed of the target object.

3. The method according to claim 2, wherein the changing the display state of the dynamic three-dimensional model into a display state corresponding to the changed moving state of the target object when the moving state of the target object changes comprises:

changing the display state of the dynamic three-dimensional model into a static display state when the moving speed of the target object is less than a first speed threshold;

changing the display state of the dynamic three-dimensional model into a display state of moving at a first frequency when the moving speed of the target object is not less than the first speed threshold and less than a second speed threshold, the second speed threshold being greater than the first speed threshold; and changing the display state of the dynamic three-dimensional model into a display state of moving at a secondary frequency when the moving speed of the target object is not less than the second speed threshold, the second frequency being greater than the first frequency.

4. The method according to claim 3, wherein the method further comprises:

changing the display state of the dynamic three-dimensional model into a dizziness display state when the moving speed of the target object is less than the first speed threshold, and the corresponding position of the dynamic three-dimensional model in the navigation route is in a congested road condition state.

5. The method according to claim 2, wherein the changing the display state of the dynamic three-dimensional model into a display state corresponding to the changed moving state of the target object when the moving state of the target object changes comprises:

changing the display state of the dynamic three-dimensional model to a display state prompting to adjust the moving speed when the moving speed of the target object exceeds a speed limit of a road corresponding to the position of the dynamic three-dimensional model.

6. The method according to claim 1, wherein the method further comprises:

displaying safety prompt information about moving safety and/or activity description information about the dynamic three-dimensional model when the corresponding position of the dynamic three-dimensional model in the navigation route is in a congested road condition state and a congestion duration exceeds a congestion time threshold.

7. The method according to claim 1, wherein the method further comprises:

displaying a three-dimensional model list comprising a plurality of types of dynamic three-dimensional models in response to a model type triggering operation;

selecting a dynamic three-dimensional model of a target type in response to a selection operation triggered in the three-dimensional model list; and replacing the dynamic three-dimensional model by the dynamic three-dimensional model of the target type.

8. The method according to claim 1, wherein the method further comprises:

displaying a route planning operation area corresponding to the electronic map in response to a route planning triggering operation triggered in the electronic map;

displaying a planning route for the target object generated based on a route planning operation in the electronic map in response to the route planning operation triggered in the route planning operation area; and displaying a model mark corresponding to the dynamic three-dimensional model at a position in the planning route, the position indicating the current position of the target object.

9. The method according to claim 8, wherein the displaying a navigation route for a target object in a display interface of an electronic map comprises:

controlling the electronic map to enter a navigation mode in response to a navigation triggering operation triggered for the planning route; and displaying a navigation route for the target object determined from the planning route based on the navigation triggering operation in the navigation mode of the electronic map.

10. The method according to claim 1, wherein the method further comprises:

displaying a model mark corresponding to the dynamic three-dimensional model at a position in the electronic map when the electronic map is in a two-dimensional map scene, the position indicating the current position of the target object.

11. The method according to claim 1, wherein the method further comprises:

displaying feedback information corresponding to a voice control instruction in a perceptual form response to the voice control instruction triggered for the dynamic three-dimensional model.

12. The method according to claim 1, wherein the method further comprises:

displaying a travelled moving route corresponding to the navigation process when the navigation route-based navigation process ends; and displaying model marks corresponding to the dynamic three-dimensional model at a starting position and an ending position on the travelled moving route respectively.

13. The method according to claim 12, wherein the method further comprises:

acquiring moving data corresponding to the navigation process when the navigation route-based navigation process ends; and acquiring a model mark corresponding to the dynamic three-dimensional model; and generating the travelled moving route according to the moving data, and rendering the model mark to the starting position and the ending position in the travelled moving route.

14. The method according to claim 1, wherein the method further comprises:

acquiring navigation data corresponding to the navigation route when a navigation triggering instruction triggered for the electronic map is received; and performing rendering processing based on the navigation data and the model data of the dynamic three-dimensional model to display the dynamic three-dimensional model at the current position of the target object in the displayed navigation route.

15. The method according to claim 14, wherein the performing rendering processing based on the navigation data and the model data of the dynamic three-dimensional model to display the dynamic three-dimensional model at the current position of the target object in the displayed navigation route comprises:

querying a model cache data set corresponding to the electronic map;

acquiring the model data of the dynamic three-dimensional model from the model cache data set when the model cache data set comprises the model data of the dynamic three-dimensional model; and generating the navigation route according to the navigation data, and rendering the model data into the navigation route, to display the dynamic three-dimensional model at the current position of the target object in the navigation route.

16. The method according to claim 1, wherein dynamically adjusting the frame rate of the dynamic three-dimensional model according to the resource saturation state and the moving state of the target object further comprises:
in response to the moving state of the target object indicating the second moving speed and the resource saturation state being not below the saturation threshold, alternating the frame rate of the three-dimensional model by using the first frame rate for a first duration and using the second frame rate for a second duration.

17. The method according to claim 1, wherein the method further comprises:
acquiring a three-dimensional model diagram corresponding to the dynamic three-dimensional model when terminal corresponding to the electronic map does not meet a dynamic model display condition; and
displaying the three-dimensional model diagram at the current position of the target object in the navigation route.

18. A computer device, comprising a non-transitory memory and one or more processors, the memory storing computer-readable instructions, the computer-readable instructions, when executed by the processors, causing the one or more processors to perform
displaying a navigation route for a target object in a display interface of an electronic map;
displaying a dynamic three-dimensional model at a target position in the navigation route, the target position indicating a current position of the target object, and a current display state of the dynamic three-dimensional model corresponding to the current moving state of the target object;
changing a display state of the dynamic three-dimensional model in response to a change of the moving state of the target object in a navigation process associated with the navigation route;
determining a resource saturation state of a terminal corresponding to the electronic map; and
dynamically adjusting a frame rate of the dynamic three-dimensional model according to the resource saturation state and the moving state of the target object, comprising:
in response to the moving state of the target object indicating a first moving speed, adjusting the frame rate of the three-dimensional model to a first frame rate;
in response to the moving state of the target object indicating a second moving speed greater than the first moving speed and the resource saturation state being below a saturation threshold, maintaining the frame rate of the three-dimensional model at a second frame rate higher than the first frame rate.

19. One or more non-transitory readable storage media storing computer-readable instructions, the computer-readable instructions, when executed by one or more processors, causing the one or more processors to perform
displaying a navigation route for a target object in a display interface of an electronic map;
displaying a dynamic three-dimensional model at a target position in the navigation route, the target position indicating a current position of the target object, and a current display state of the dynamic three-dimensional model corresponding to the current moving state of the target object;
changing a display state of the dynamic three-dimensional model in response to a change of the moving state of the target object in a navigation process associated with the navigation route;
determining a resource saturation state of a terminal corresponding to the electronic map; and
dynamically adjusting a frame rate of the dynamic three-dimensional model according to the resource saturation state and the moving state of the target object, comprising:
in response to the moving state of the target object indicating a first moving speed, adjusting the frame rate of the three-dimensional model to a first frame rate; and
in response to the moving state of the target object indicating a second moving speed greater than the first moving speed and the resource saturation state being below a saturation threshold, maintaining the frame rate of the three-dimensional model at a second frame rate higher than the first frame rate.

20. The non-transitory readable storage media according to claim 19, wherein the changing the display state of the dynamic three-dimensional model in response to the change of the moving state of the target object in the navigation process associated with the navigation route comprises:
changing the display state of the dynamic three-dimensional model into a display state corresponding to the changed moving state of the target object when the moving state of the target object changes in the navigation process, wherein the change of the moving state of the target object corresponds to a change of a moving speed of the target object.

* * * * *